US012790000B2

(12) United States Patent
Satterfield et al.

(10) Patent No.: US 12,790,000 B2
(45) Date of Patent: Nov. 10, 2026

(54) TRAY TABLE WITH DETENT MECHANISM

(71) Applicant: S & S Numerical Control, Inc., Northridge, CA (US)

(72) Inventors: Johnny A. Satterfield, Chatsworth, CA (US); Dane Sandifer, Woodland Hills, CA (US)

( * ) Notice: Subject to any disclaimer, the term of this patent is extended or adjusted under 35 U.S.C. 154(b) by 21 days.

(21) Appl. No.: 19/059,086

(22) Filed: Feb. 20, 2025

(65) Prior Publication Data

US 2025/0187732 A1 Jun. 12, 2025

Related U.S. Application Data

(63) Continuation of application No. 18/098,331, filed on Jan. 18, 2023, now Pat. No. 12,258,131.

(60) Provisional application No. 63/300,997, filed on Jan. 19, 2022.

(51) Int. Cl.
*B64D 11/06* (2006.01)

(52) U.S. Cl.
CPC ................................ *B64D 11/0638* (2014.12)

(58) Field of Classification Search
CPC ........ B64D 11/0638; A47B 1/10; A47B 11/00
See application file for complete search history.

(56) References Cited

U.S. PATENT DOCUMENTS

| | | | | | |
|---|---|---|---|---|---|
| 5,425,313 | A * | 6/1995 | Rowan | A47B 13/081 108/65 |
| 5,547,247 | A * | 8/1996 | Dixon | A47C 7/70 297/145 |
| 11,091,267 | B1 * | 8/2021 | Lawson | B64D 11/0605 |
| 12,122,282 | B2 * | 10/2024 | Adams | B60N 3/001 |
| 12,258,131 | B2 * | 3/2025 | Satterfield | B64D 11/0605 |
| 2010/0067833 | A1 * | 3/2010 | Jin | H04M 1/0237 384/8 |
| 2012/0167807 | A1 * | 7/2012 | Legeay | B64D 11/0606 108/41 |
| 2016/0090180 | A1 * | 3/2016 | Thompson | F16C 19/50 384/590 |
| 2017/0088268 | A1 * | 3/2017 | Kinard | B64D 11/0646 |
| 2017/0238696 | A1 * | 8/2017 | Ehrreich | A47B 9/20 |
| 2019/0061954 | A1 * | 2/2019 | Miedema | B60N 3/002 |
| 2021/0307548 | A1 * | 10/2021 | Raghoonandan | B60N 3/102 |
| 2023/0046054 | A1 * | 2/2023 | Harris | B60N 3/002 |
| 2023/0227163 | A1 * | 7/2023 | Satterfield | B64D 11/0638 297/146 |
| 2024/0199214 | A1 * | 6/2024 | Pence | B64D 11/0638 |

* cited by examiner

*Primary Examiner* — Daniel J Rohrhoff

(74) *Attorney, Agent, or Firm* — Matthew J. Spark; Calyx Law LLP

(57) ABSTRACT

A detent mechanism is provided for a tray table of an aircraft. The detent mechanism includes an actuator configured to move along with a table leaf of the tray table as the table leaf rotates between a stowed position and a deployed position of the table leaf. The detent mechanism includes a follower biased toward an open position of the follower. The follower is configured to be moved against the bias from the open position into a closed position of the follower by engagement of the actuator with the follower as the table leaf rotates from the stowed position into the deployed position. The follower includes a magnetic component configured to releasably hold the follower in the closed position.

26 Claims, 15 Drawing Sheets

TRAY TABLE WITH DETENT MECHANISM

CROSS-REFERENCE TO PRIOR APPLICATIONS

The instant application is a continuation of U.S. patent application Ser. No. 18/098,331, filed on Jan. 18, 2023, which claims the benefit of U.S. Provisional Patent Application No. 63/300,997, filed on Jan. 19, 2022, which are incorporated herein by reference in its entirety.

FIELD OF THE INVENTION

The present invention relates generally to tables. More particularly, the present invention relates to mechanism for deploying a table associated with an aircraft passenger seat.

BACKGROUND

Commercial airline companies strive to provide improved services for their customers as well as improving passenger comfort and convenience. It is common for passengers on both private and commercial aircraft to have use of tables built into the seatback of a passenger seat directly in front of them or tables deployable from within a seat console to one side of the passenger where the table surface must be unfolded to provide sufficient surface area for placement of food, drink or other objects thereupon.

Different types of tables associated with aircraft passenger seats have been proposed that can be moved between stowed and deployed positions. However, such tables have their limitations and can always be improved.

Slide-out tray tables for aircraft include telescoping bases that enable the tray table to be extended outward from a stowed position toward an extended position. Once the tray table has been pulled outward from the stowed position to the extended position or a partially-extended position, a table leaf of the tray table can be rotated to a deployed position in which the tray table can be used. However, it may be difficult for a user to know whether the table leaf has rotated into the deployed position, which may cause the user to mishandle the table leaf. For example, the user may attempt to rotate the table leaf past the deployed position. Mishandling of the table leaf may prematurely wear and/or damage the table leaf and/or other components of the tray table.

Accordingly, there is a need for an improved table movable between stowed and deployed positions. There is also a need for table that can be stowed within a seat console. There is an additional need for a table that is easier to manufacture, assemble, adjust, and maintain. The present invention satisfies these needs and provides other related advantages.

SUMMARY

The present invention provides mechanisms for an improved tray table movable between stowed and deployed positions. The present invention also provides mechanisms for a deployable tray table that can be stowed within a seat, seat console, bulkhead, wall, or the like of an aircraft. The present invention provides mechanisms for a deployable tray table that is easier to manufacture, assemble, adjust, and maintain. The present invention satisfies these needs and provides other related advantages.

In one aspect, a detent mechanism is provided for a tray table of an aircraft. The detent mechanism includes an actuator configured to move along with a table leaf of the tray table as the table leaf rotates between a stowed position and a deployed position of the table leaf. The detent mechanism includes a follower biased toward an open position of the follower. The follower is configured to be moved against the bias from the open position into a closed position of the follower by engagement of the actuator with the follower as the table leaf rotates from the stowed position into the deployed position. The follower includes a magnetic component configured to releasably hold the follower in the closed position.

In another aspect, a detent mechanism is provided for a tray table of an aircraft. The detent mechanism includes a connector rail configured to be held by a telescoping carriage that is configured to expand outwardly and retract inwardly relative to a base plate of the tray table between an extended position and a retracted position of the carriage. The connector rail is mounted to the carriage such that the connector rail is configured to move along with the carriage between the retracted position and a partially-extended position of the carriage. The detent mechanism includes a magnetic detent configured to releasably hold the carriage in the partially-extended position.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts.

DETAILED DESCRIPTION

Figure 1:
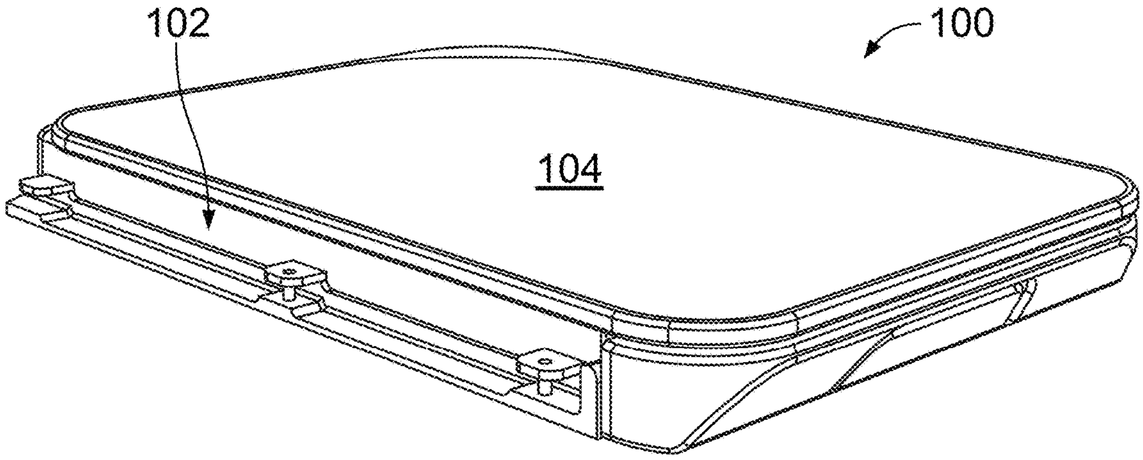
FIG. 1 illustrates a perspective view illustrating a tray table for an aircraft according to an implementation.

The following detailed description describes the present embodiments, with reference to the accompanying drawings. In the drawings, reference numbers label elements of the present embodiments. These reference numbers are reproduced below in connection with the discussion of the corresponding drawing features.

It is to be understood that the figures and descriptions of the present invention have been simplified to illustrate elements that are relevant for a clear understanding of the present invention, while eliminating, for the purpose of clarity, many other elements found in rear derailleurs. Those of ordinary skill in the pertinent arts may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the pertinent arts.

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments and implementations of the present application, it is understood that such terms are merely used with respect to the orientations shown in the drawings. The orientations can be inverted, rotated, or otherwise changed, such that a top side becomes a bottom side if the structure is flipped 180°, becomes a left side or a right side if the structure is pivoted 90°, and the like.

Certain implementations provide a detent mechanism for a tray table of an aircraft. The detent mechanism includes an actuator configured to move along with a table leaf of the tray table as the table leaf rotates between a stowed position and a deployed position of the table leaf. The detent mechanism includes a follower biased toward an open position of the follower. The follower is configured to be moved against the bias from the open position into a closed position of the follower by engagement of the actuator with the follower as the table leaf rotates from the stowed position into the deployed position. The follower includes a magnetic component configured to releasably hold the follower in the closed position.

In some implementations, a detent mechanism includes a connector rail configured to be held by a telescoping carriage that is configured to expand outwardly and retract inwardly relative to a base plate of the tray table between an extended position and a retracted position of the carriage. The connector rail is mounted to the carriage such that the connector rail is configured to move along with the carriage between the retracted position and a partially-extended position of the carriage. The detent mechanism includes a magnetic detent configured to releasably hold the carriage in the partially-extended position.

Certain implementations provide detent mechanisms that operate in an unconventional manner to releasably hold a tray table in a partially-extended position of the tray table. Certain implementations provide detent mechanisms that operate in an unconventional manner to releasably hold a table leaf of a tray table in a deployed position of the table leaf.

One or more tray tables of various implementations have an improved user experience, for example as compared to at least some known tray tables. For example, certain implementations provide tray tables that are more intuitive to use, for example as compared to at least some known tray tables. Certain implementations, for example, provide a satisfying feel (e.g., a feeling of quality, etc.) of the movement of the tray table into a partially-extended position. Moreover, and for example, certain implementations provide a satisfying feel of the movement of a table leaf of the tray table into a deployed position.

Some implementations of the tray table prevent, or reduce the likelihood of, damage to and/or wearing of the tray table, for example caused by mishandling of the tray table (e.g., attempting to rotate the table leaf past the deployed position, etc.), etc. As such, maintenance costs, for example as compared to at least some known tray tables, are reduced.

Figure 2:
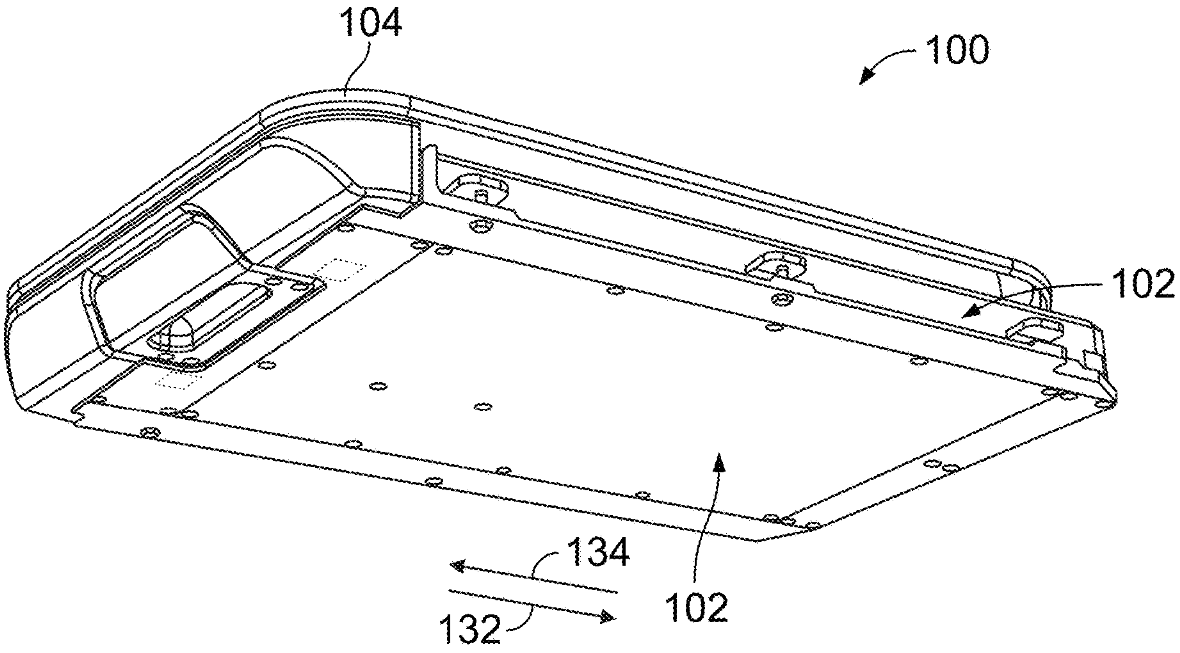
FIG. 2 illustrates another perspective view illustrating the tray table shown in FIG. 1 according to an implementation.

With references now to the figures, perspective views of a tray table 100 for an aircraft (e.g., the aircraft 500 shown in FIG. 14, etc.) are provided in FIGS. 1 and 2. The tray table 100 includes a telescoping base 102, a table leaf 104 mounted to the base 102, and detent mechanisms 106 and/or 108. The detent mechanisms 106 and 108 are not visible in FIGS. 1 and 2 but will be described in more detail below with respect to FIGS. 4-7 and 8-12, respectively. For example, the detent mechanism 106 is configured to releasably hold the tray table 100 in a partially-extended position of the tray table 100. Moreover, and for example, the detent mechanism 108 is configured to releasably hold the table leaf 104 of the tray table 100 in a deployed position of the table leaf 104.

FIGS. 1 and 2 illustrate the tray table or table assembly 100 in the stowed position. The stowed position of the tray table 100 may also be referred to herein as a "retracted position" of the tray table 100. The tray table 100 may be configured to be mounted within the passenger compartment of an aircraft adjacent (e.g., in front of, alongside, on the back of, etc.) a seat, for example. Likewise, the tray table 100 may be configured in an aircraft in connection with a wall, bulkhead, or a seat console having a wall with an exterior surface, and a recess extending a depth past the exterior surface of the wall, bulkhead, seat console, or seat. The tray table 100 may be stowed generally within the recess when the tray table 100 is in a stowed configuration, the recess being sized and shaped to receive the tray table 100. When the tray table 100 is in the stowed configuration, the table leaf 104 is in a generally horizontal position, and an exterior side of the tray table 100 facing outwardly from the recess, forming at least a portion of the exterior surface of the wall, bulkhead, seat, or seat console, and generally conforming to and flush with a remaining portion of the exterior surface of the wall, bulkhead, seat, or seat console.

Referring now to FIG. 3, the tray table 100 is moveable between the stowed position and a deployed position. FIG. 3A illustrates the tray table 100 in the stowed position, while FIG. 3C illustrates the tray table 100 in the deployed position. To move the tray table 100 to the deployed position (e.g., deploy the tray table 100 for use, etc.), the tray table 100 is moveable from the stowed position to an extended position of the tray table 100, which is shown in FIG. 3B. For example, the base 102 of the tray table 100 is configured to telescope inwardly and outwardly along a longitudinal axis 116 to move the tray table 100 between the stowed position of the tray table 100 shown in FIG. 3A and the extended position of the tray table 100 shown in FIG. 3B. Specifically, the base 102 is configured to expand outwardly and retract inwardly along the longitudinal axis 116 between an extended position of the base 102 shown in FIG. 3B and a retracted position of the base 102 shown in FIG. 3A. The retracted position of the base 102 corresponds to the stowed position of the tray table 100 (i.e., the base 102 is moved into the retracted position of the base 102 to move the tray table 100 into the stowed position of the tray table 100). The extended position of the base 102 corresponds to the extended position of the tray table 100 (i.e., the base 102 is moved into the extended position of the base 102 to thereby move the tray table 100 into the extended position of the tray table 100). In other words, the base 102 of the tray table 100 is configured to expand outwardly and retract inwardly along the longitudinal axis 116 between the extended position of the tray table 100 and the stowed position of the tray table 100.

Figure 3A:
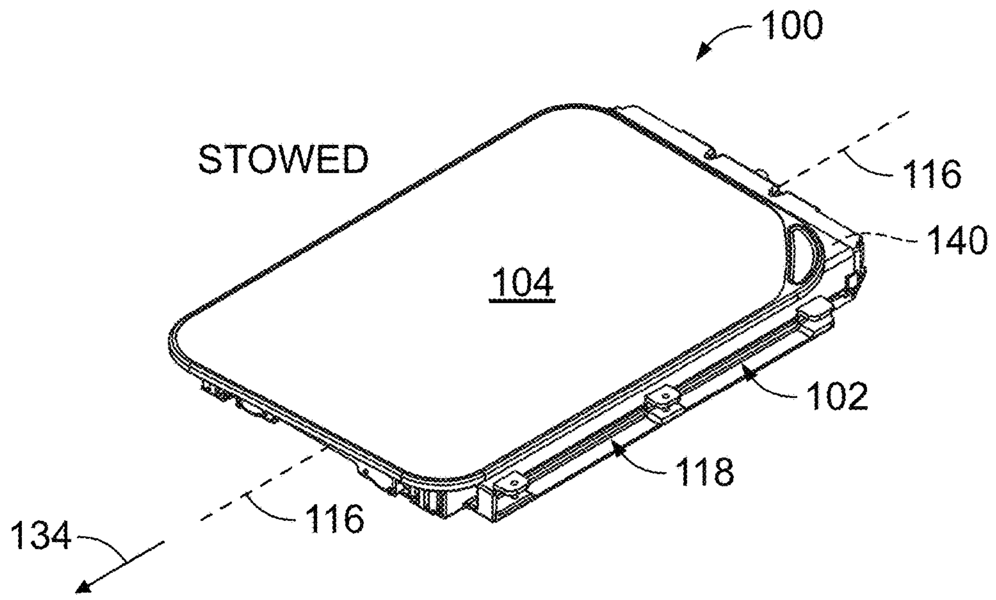
FIGS. 3A-3D illustrate perspective views of the tray table shown in FIGS. 1 and 2 according to an implementation in stowed, extended, deployed, and partially extended configurations.
Figure 3B:
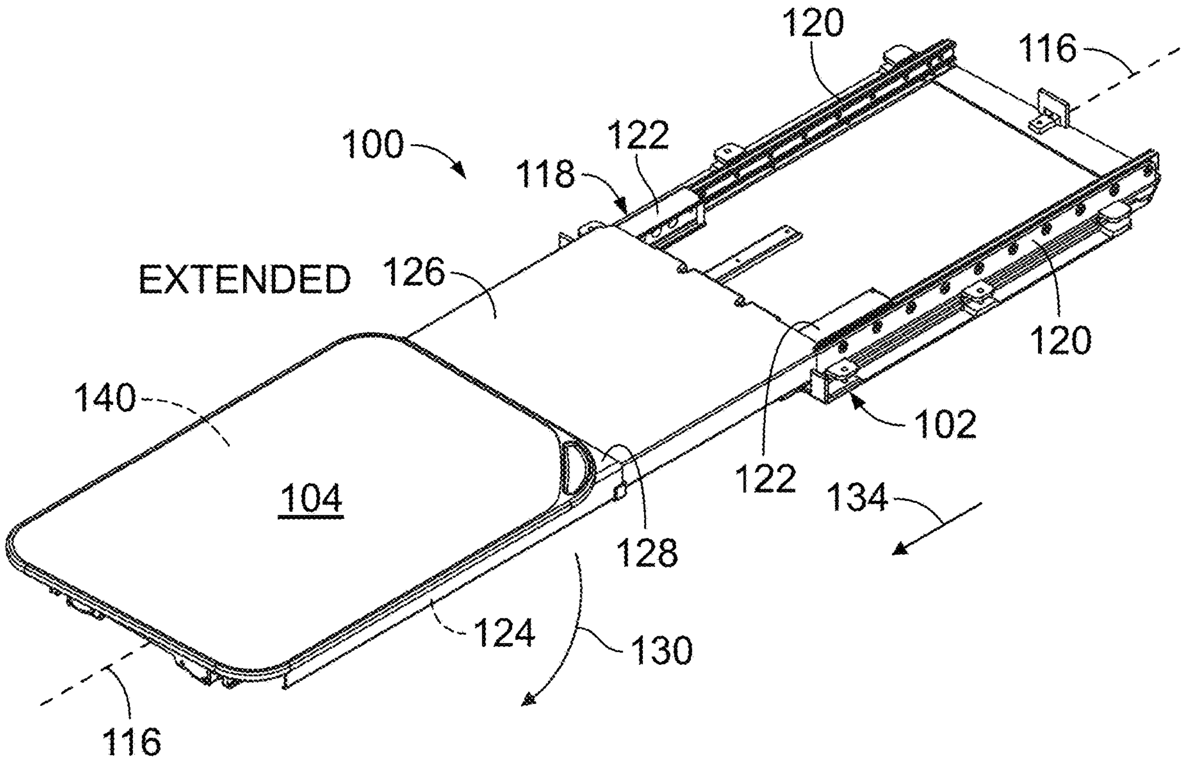
Figure 3C:
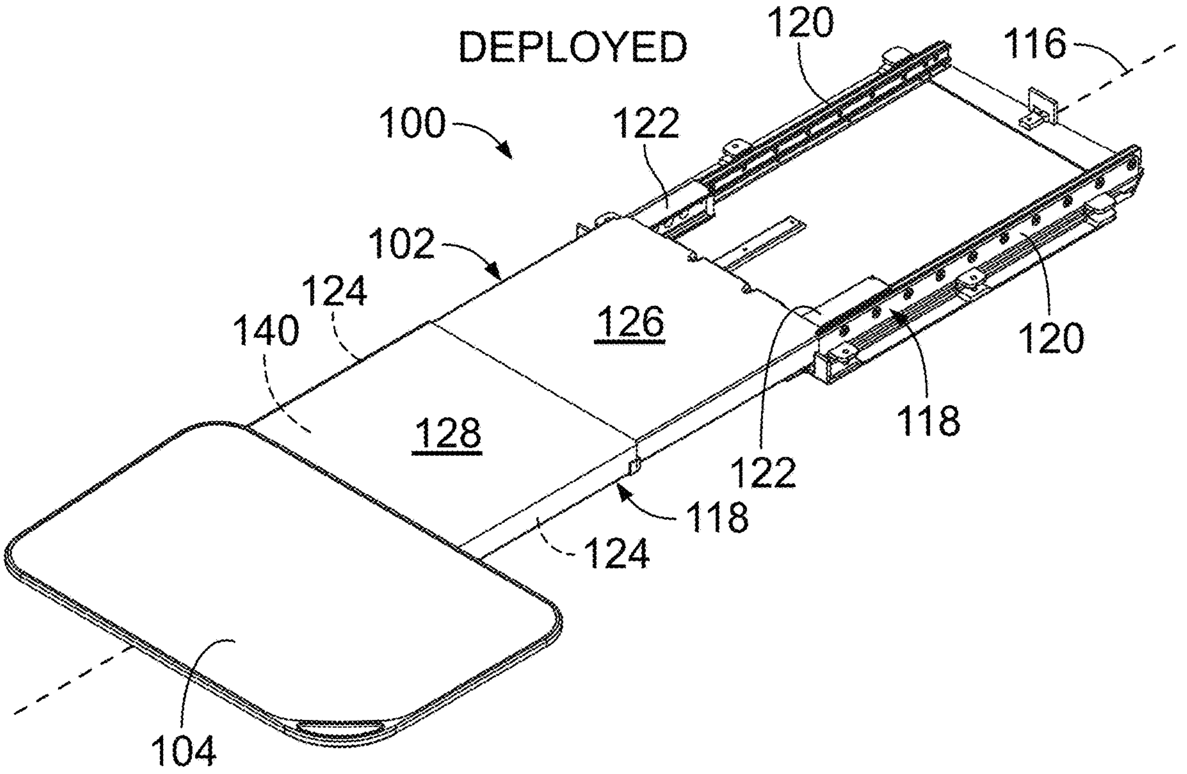
Figure 3D:
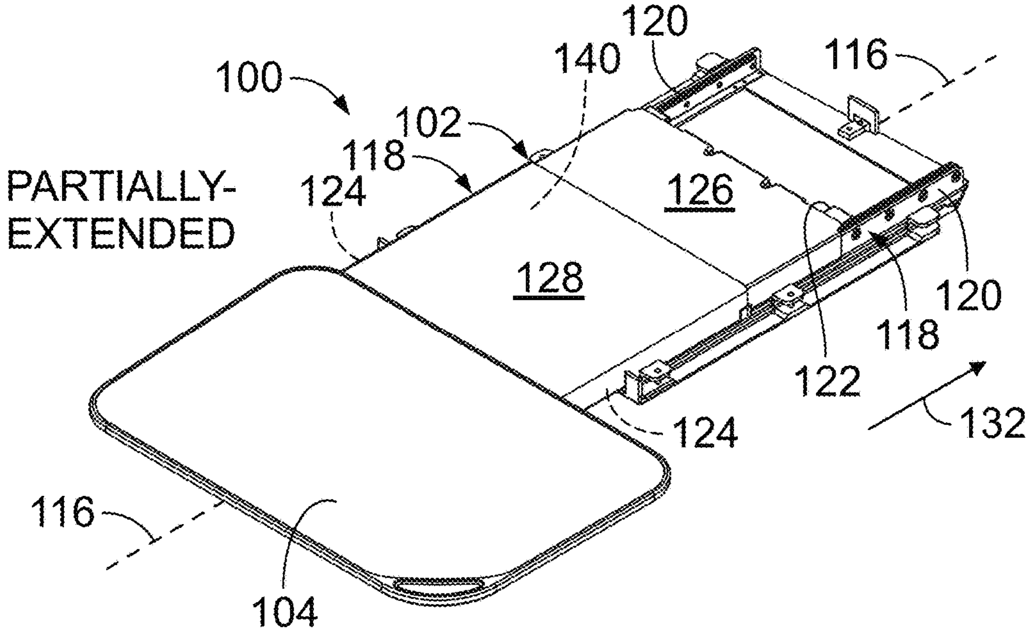
Figure 4:
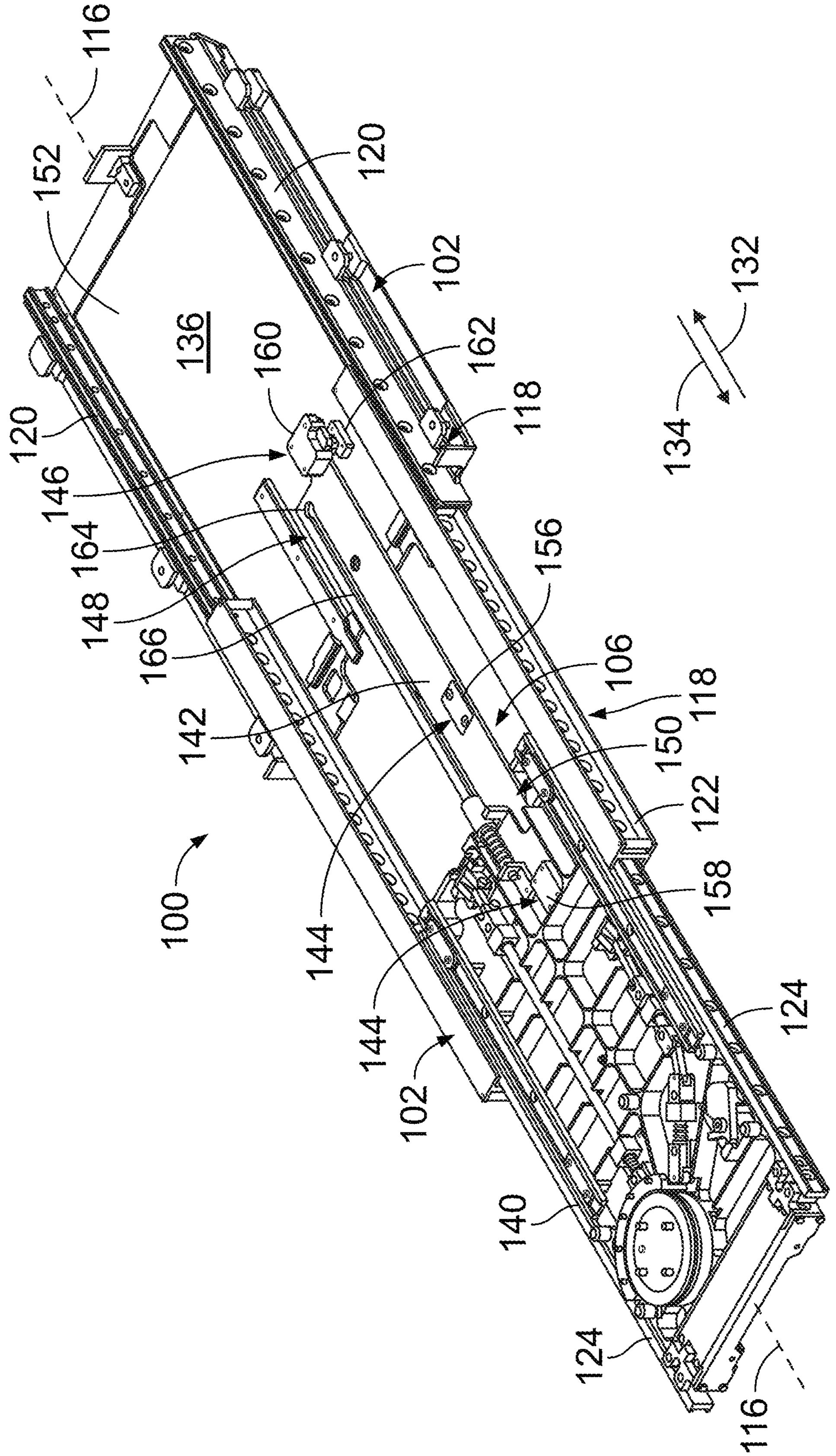
FIG. 4 illustrates a perspective view of a portion of the tray table shown in FIGS. 1 and 2 illustrating a detent mechanism according to an implementation.
Figure 5:
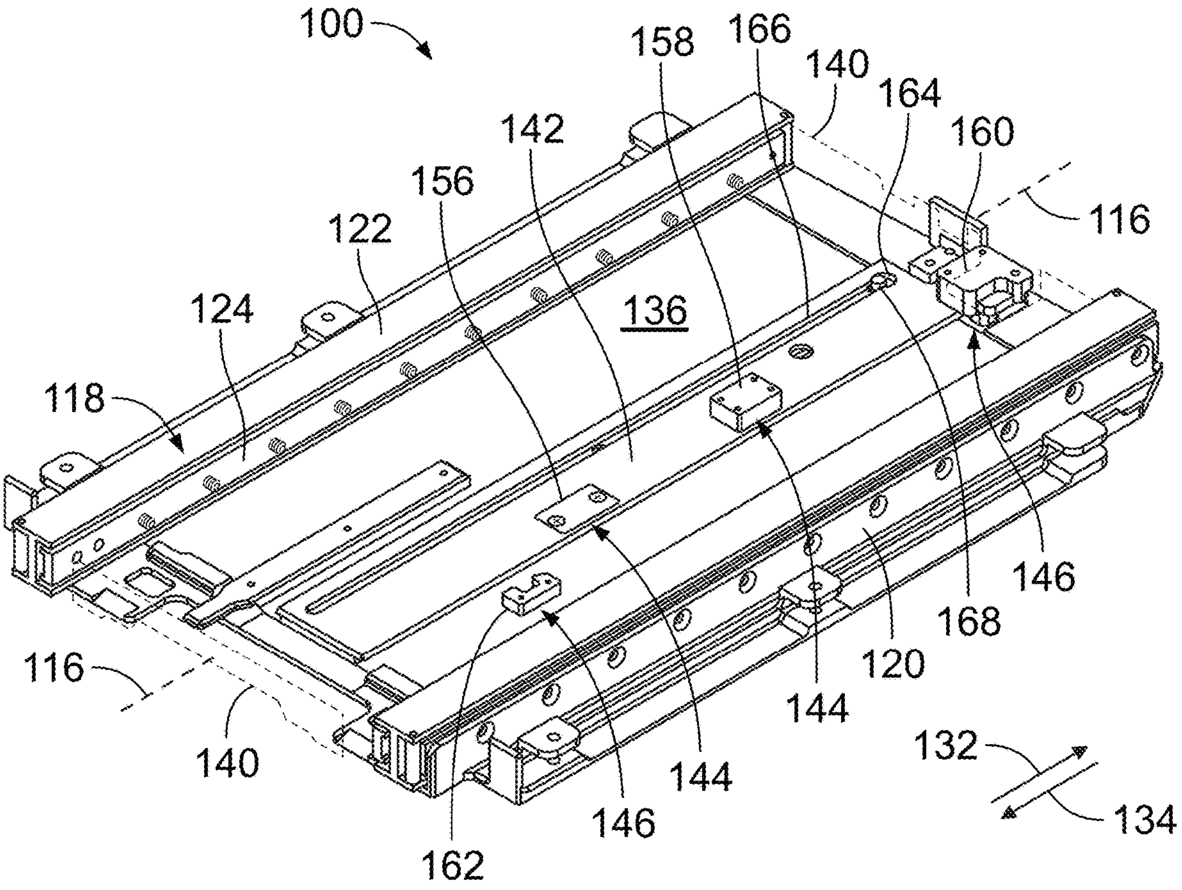
FIG. 5 illustrates a perspective view of the tray table shown in FIG. 4 illustrating a carriage of the tray table in a retracted position according to an implementation.
Figure 6:
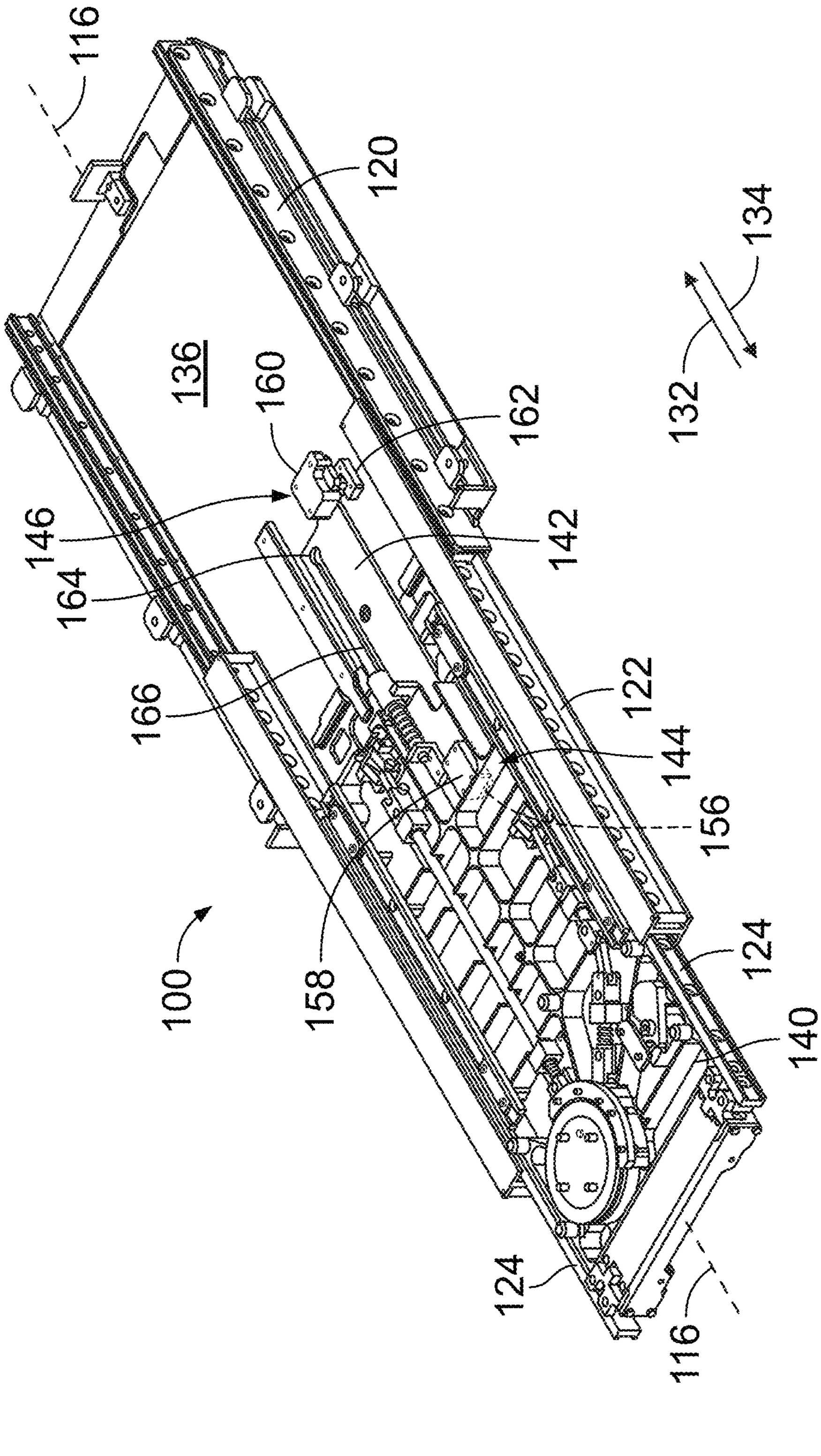
FIG. 6 illustrates a perspective view of the tray table shown in FIG. 4 illustrating the carriage of the tray table in a partially-extended position according to an implementation.

For example, in some implementations, the base 102 of the tray table 100 includes a telescopic rail system 118 having rail sets 120, 122, and 124 (the rail sets 122 and 124 are best seen in FIGS. 4-6). The rail sets 120, 122, and 124 are slidably interconnected with each other such that the rail sets 120, 122, and 124 are configured to slide relative to each other along the longitudinal axis 116 to thereby expand and retract the base 102 along the longitudinal axis 116. FIGS. 3B, 3C, and 3D illustrate optional covers 126 and 128 that cover the rail sets 122 and 124. The base 102 is not limited to the exemplary rail system 118 shown and described herein. Rather, in addition or alternatively to the rail system 118, the base 102 may include any other structure, system, mechanism, device, and/or the like that enables the base 102 to expand and retract along the longitudinal axis 116 and thereby move the tray table 100 between the stowed and extended positions. Although shown as having three rail sets 120, 122, and 124, the rail system 118 may include any other number of rail sets. Moreover, although each rail set 120, 122, and 124 includes two opposing rails in the exemplary implementation, in other implementations one or more rail sets includes another number of rails (e.g., a single rail, three rails, etc.).

The table leaf 104 of the tray table 100 is selectively rotatable relative to the base 102 between a stowed position of the table leaf 104 and a deployed position of the table leaf 104. As shown in FIG. 3A, the table leaf 104 is in the stowed position thereof when the tray table 100 is in the stowed position thereof. To further deploy the tray table 100 from the extended position of the tray table 100 shown in FIG. 3B to the deployed position of the tray table 100 shown in FIG. 3C, the table leaf 104 is rotated relative to the base 102 (e.g., in the direction of the arrow 130, etc.) from the stowed position thereof shown in FIG. 3B into the deployed position of the table leaf 104 shown in FIG. 3C. In some implementations, the tray table 100 is configured such that the table leaf 104 extends over the lap of an occupant of the corresponding seat when the tray table 100 is in the deployed position thereof.

From the deployed position shown in FIG. 3C, the tray table 100 can be moved to a partially-extended position of the tray table 100, which is shown in FIG. 3D. Specifically, in the partially-extended position of the tray table 100, the base 102 is partially collapsed (e.g., retracted partially inwardly, etc.) along the longitudinal axis 116 such that the table leaf 104 is moved along the longitudinal axis 116 in the direction of the arrow 132 relative to the position of the table leaf 104 in the extended position of the tray table 100 shown in FIGS. 3B and 3C. In other words, the base 102 of the tray table 100 includes a partially-extended position shown in FIG. 3D that corresponds to the partially-extended position of the tray table 100 (i.e., the base 102 is moved into the partially-extended position thereof to thereby move the tray table 100 into the partially-extended position thereof).

Although shown in FIG. 3D as being in the deployed position when the tray table 100 is in the partially-extended position, the table leaf 104 is not limited thereto. In some implementations, the table leaf 104 is moveable between the various positions of the table leaf 104 (e.g., the stowed position, the deployed position, one or more intermediate positions between the stowed and deployed positions, etc.) when the tray table 100 is in the partially-extended position. Moreover, in some implementations the table leaf 104 is locked into a position (e.g., the stowed position, the deployed position, one or more intermediate positions between the stowed and deployed positions, etc.) when the tray table 100 is in the partially-extended position.

In some implementations, the partially-extended position of the tray table 100 is an egress position of the tray table 100. The egress position of the tray table 100, for example, enables an occupant of the corresponding seat to stand up and/or leave the seat, provides the occupant with greater freedom of movement, provides the occupant with more arm and/or leg space, etc. Moreover, in some implementations, the partially-extended position of the tray table 100 is a position that enables the occupant of the corresponding seat to use the table leaf 104 as a desk (e.g., for writing, reading, supporting a laptop computer, eating, use as a cocktail and/or other drink table, etc.).

In operation, the tray table 100 is deployed for use by pulling on the tray table 100 in the direction of the arrow 134 to thereby move the tray table 100 from the stowed position of the tray table 100 shown in FIG. 3A to the extended position of the tray table 100 shown in FIG. 3B. The table leaf 104 of the tray table 100 is then rotated from the stowed position of the table leaf 104 shown in FIGS. 3A and 3B into the deployed position of the table leaf 104 shown in FIG. 3C. As shown, in the exemplary implementation, the table leaf 104 is rotated approximately 90° from the stowed position of the table leaf 104 shown in FIGS. 3A and 3B into the deployed position of the table leaf 104 shown in FIG. 3C. Other angular differences (e.g., approximately 180°, etc.) between the stowed and deployed positions of the table leaf 104 are contemplated as being within the scope of the present application.

Referring now to FIG. 4, the detent mechanism 106 of the tray table 100 will now be described. The covers 126 and 128 (shown in FIG. 3) of the base 102 have been removed from FIG. 4 to better illustrate the detent mechanism 106. The base 102 of the tray table 100 includes a base plate 136 into which the rail set 120 of the rail system 118 is incorporated (e.g., the rail set 120 is mounted to the base plate 136 as shown in the exemplary implementation of FIG. 4, the rail set 120 is integrally formed as a single unitary structure with the base plate 136, etc.).

The base 102 of the tray table 100 includes a telescoping carriage 140. For example, the carriage 140 is configured to telescope inwardly and outwardly along the longitudinal axis 116 to move the tray table 100 between the stowed position of the tray table 100 and the extended position of the tray table 100. Specifically, the carriage 140 is configured to expand outwardly and retract inwardly along the longitudinal axis 116, and relative to the base plate 136, between an extended position of the carriage 140 shown in FIG. 4 and a retracted position of the carriage 140 shown in FIG. 5 (the carriage 140 is shown in phantom in FIG. 5 for clarity). The retracted position of the carriage 140 corresponds to the stowed position of the tray table 100 (i.e., the carriage 140 is moved into the retracted position to move the tray table 100 into the stowed position). The extended position of the carriage 140 corresponds to the extended position of the tray table 100 (i.e., the carriage 140 is moved into the extended position to thereby move the tray table 100 into the extended position). The carriage 140 includes a partially-extended position (shown in FIG. 6) that corresponds to the partially-extended position of the tray table 100 (i.e., the carriage 140 is moved into the partially-extended position thereof to thereby move the tray table 100 into the partially-extended position thereof).

The carriage 140 holds the table leaf 104 (FIGS. 1-3, 11, and 12). In other words, the table leaf 104 of the tray table 100 is mounted on the carriage 140 such that the table leaf 104 is carried by the carriage 140 for movement with the carriage 140 as the carriage 140 telescopes inwardly and outwardly between the retracted and extended positions thereof. In the exemplary implementation, the telescoping movement of the carriage 140 is enabled by the rail set 124 of the rail system 118, which is incorporated into the carriage 140 (e.g., the rail set 124 is mounted to the carriage 140 as shown in the exemplary implementation of FIG. 4; the rail set 124 is integrally formed as a single unitary structure with the carriage 140; etc.).

The detent mechanism 106 includes a translating connector rail 142 and a magnetic detent 144. Optionally, the detent mechanism 106 includes a mechanical latch mechanism 146, which will be described in more detail below. The connector rail 142 is configured to translate along the longitudinal axis 116 between a retracted position (shown in FIG. 5) of the connector rail 142 that corresponds to the retracted position of the carriage 140, and an extended position (shown in FIGS. 4 and 6) of the connector rail 142 that corresponds to the partially-extended position of the carriage 140 (i.e., the connector rail 142 is in the extended position thereof when the carriage 140 is in the partially-extended position thereof). In other words, the connector rail 142 moves along the longitudinal axis 116 relative to the base plate 136 between the retracted and extended positions of the connector rail 142. As will be described below, the connector rail 142 remains in the extended position of the connector rail 142 (shown in FIGS. 4 and 6) when the carriage 140 is in the extended position thereof.

The connector rail 142 extends a length from an end portion 148 to an opposite end portion 150. The end portion 148 is slidably mounted to the base plate 136 such that the connector rail 142 is slidable relative to the base plate 136 as the carriage 140 telescopes inwardly and outwardly along the longitudinal axis 116 relative to the base plate 136. In other words, the end portion 148 of the connector rail 142 is slidably held by the base plate 136 such that the end portion 148 of the connector rail 142 is configured to move along the longitudinal axis 116 relative to the base plate 136, for example as the carriage 140 moves along the longitudinal axis 116 relative to the base plate 136.

Referring now solely to FIG. 4, the end portion 148 of the connector rail 142 is slidably mounted to the base plate 136 using a structure, system, mechanism, device, and/or the like that enables the connector rail 142 to function as described and/or illustrated herein (e.g., enables the end portion 148 of the connector rail 142 to move along the longitudinal axis 116 relative to the base plate 136, etc.). For example, in some implementations, the base plate 136 includes one or more guides (not shown; e.g., rails, retainers, tracks, etc.) that engage the connector rail 142 to guide movement of the connector rail 142 as the end portion 148 moves along the longitudinal axis 116 relative to the base plate 136. In some implementations, and for example, the connector rail 142 does not engage the base plate 136 or a guide thereof, but rather floats above a surface 152 of the base plate 136. Moreover, and for example, in some implementations the connector rail 142 rests on the surface 152 of the base plate 136 (with or without being connected thereto using, for example, one or more guides).

The end portion 150 of the connector rail 142 is mounted to the carriage 140 such that the end portion 150 of the connector rail 142 is configured to move along with the carriage 140 between the retracted position of the carriage 140 and the partially-extended position of the carriage 140. In other words, the connector rail 142 is mounted to the carriage 140 such that: (1) the carriage 140 pulls the connector rail 142 in the direction 134 along with the carriage 140 as the carriage 140 expands outwardly along the longitudinal axis 116 and moves into the partially-extended position thereof; and (2) the carriage 140 pushes the connector rail 142 in the direction 132 such that the connector rail 142 moves along with the carriage 140 in the direction 132 as the carriage 140 retracts inwardly along the longitudinal axis 116 from the partially extended position toward the retracted position thereof.

The mounting of the end portion 150 of the connector rail 142 also enables the end portion 150 of the connector rail 142 to move along the longitudinal axis 116 relative to the carriage 140. For example, the end portion 150 of the connector rail 142 is slidably mounted to the carriage 140 such that the connector rail 142 is slidable along the longitudinal axis 116 relative to the carriage 140 as the carriage 140 moves from the partially-extended position toward the extended position of the carriage 140. In other words, the end portion 150 of the connector rail 142 is slidably held by the carriage 140 such that the end portion 150 of the connector rail 142 is configured to move along the longitudinal axis 116 relative to the carriage 140 as the carriage 140 moves in the direction 134 from the partially-extended position toward the extended position thereof. Movement of the connector rail 142 along with and relative to the carriage 140 will be described in more detail below.

Figure 7:
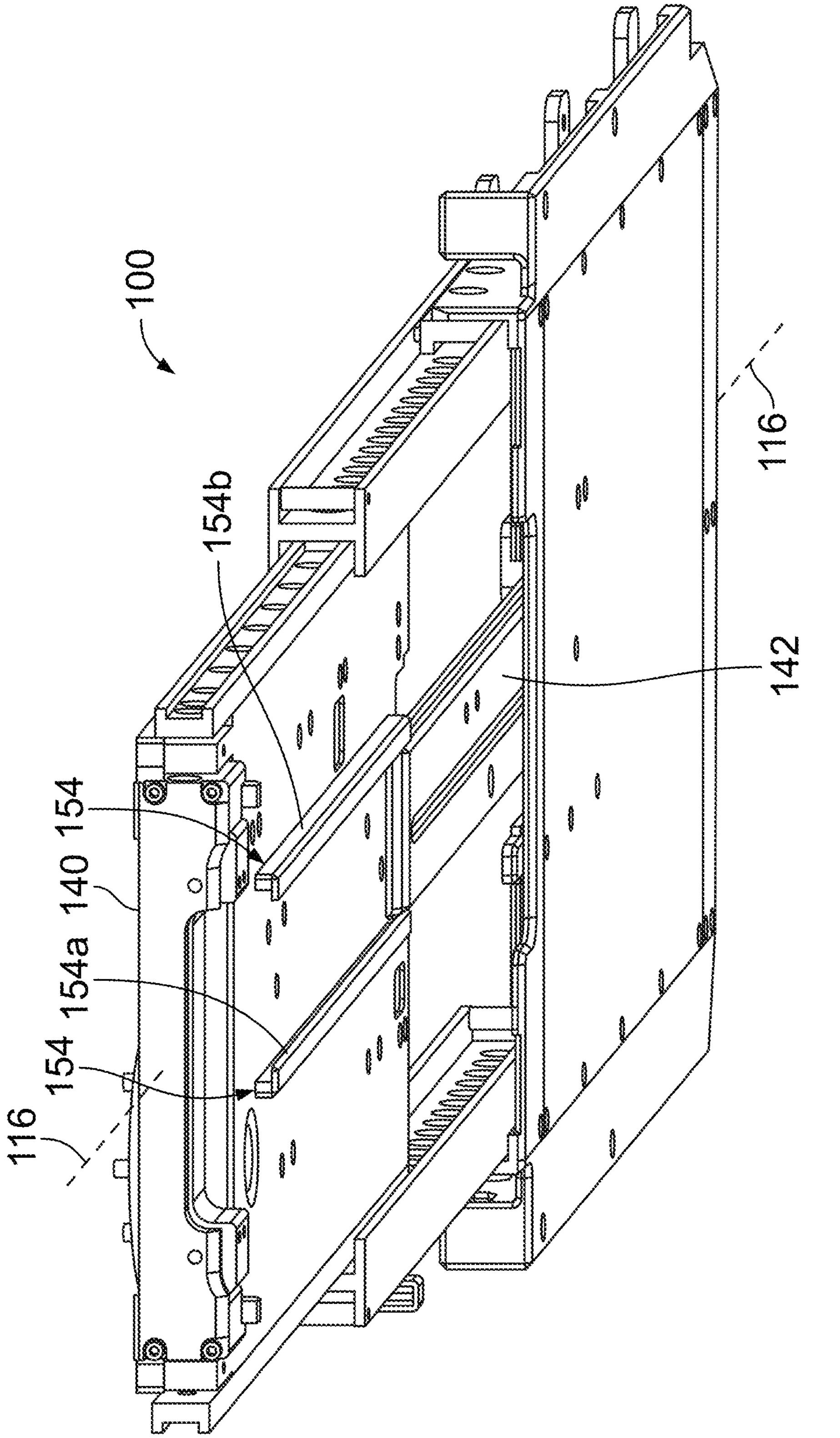
FIG. 7 illustrates a perspective view of the tray table shown in FIG. 4 illustrating a guide of the carriage of the tray table according to an implementation.

The end portion 150 of the connector rail 142 is mounted to the carriage 140 using structure, system, mechanism, device, and/or the like that enables the connector rail 142 to function as described and/or illustrated herein (e.g., enables the end portion 150 of the connector rail 142 to move along with the carriage 140 between the retracted position of the carriage 140 and the partially-extended position of the carriage 140, enables the end portion 150 of the connector rail 142 to move along the longitudinal axis 116 relative to the carriage 140, etc.). For example, in some implementations, the carriage 140 includes one or more guides (e.g., rails, retainers, tracks, etc.) that engage the connector rail 142 to guide movement of the connector rail 142 as the connector rail 142 moves along the longitudinal axis 116 relative to the carriage 140. Referring now to FIG. 7, in the exemplary implementation, the carriage 140 includes a guide 154 that includes two rails 154*a* and 154*b* that guide movement of the connector rail 142 relative to the carriage 140 along the longitudinal axis 116. The guide 154 may include any other number of the rails 154*a* and 154*b*.

Referring again to FIG. 4, as briefly described above, the detent mechanism 106 includes a magnetic detent 144. As will be described below, the magnetic detent 144 is configured to releasably hold the carriage 140 of the tray table 100 in the partially-extended position of the carriage 140 and tray table 100. The magnetic detent 144 includes magnetic components 156 and 158 of the connector rail 142 and the carriage 140, respectively, that cooperate to releasably hold the carriage 140 and tray table 100 in the partially-extended position. In other words, the connector rail 142 includes the magnetic component 156 and the carriage 140 includes the magnetic component 158. Each of the magnetic components 156 and 158 may be referred to herein as a "first" and/or a "second" magnetic component.

The magnetic components 156 and 158 are each configured such that the magnetic components 156 and 158 are magnetically attracted to each other. For example, in some implementations at least one of the magnetic components 156 or 158 includes one or more magnets that generates a magnetic field that is configured to magnetize a ferromagnetic material of the other magnetic component 156 or 158 when the magnetic components 156 and 158 are within a predetermined distance from each other. In some implementations, and for example, each of the magnetic components 156 and 158 includes one or more magnets that are magnetically attracted to each other when within the predetermined distance of each other. Each of the magnetic components 156 and 158 may include any number of magnets.

As briefly described above, the magnetic components 156 and 158 cooperate with each other to releasably hold the carriage 140 and tray table 100 in the partially-extended position. For example, and as is shown in FIG. 6, the magnetic components 156 and 158 are positioned at respective locations along the connector rail 142 and the carriage 140 such that the magnetic components 156 and 158 are at least partially aligned along the longitudinal axis 116, and thereby within the predetermined distance of each other, when the carriage 140 is in the partially-extended position. Accordingly, when the carriage 140 and tray table 100 are in the partially-extended position, the magnetic attraction between the magnetic components 156 and 158 releasably holds the carriage 140 and tray table 100 in the partially-extended position.

In the exemplary implementation, the magnetic component 156 is a discrete component from a body of the connector rail 142 that is held by the body of the connector rail 142 using any suitable method, means, fastener, and/or the like (e.g., adhesive, a weld, a braze, a threaded fastener, an interference fit, a clearance fit, a transition fit, a snap fit, a clip, a latch, etc.). In other examples, the magnetic component 156 is defined by at least a portion of the body of the connector rail 142. For example, one or more segments of the body of the connector rail 142 may define the magnetic component 156 while the remainder of the body of the connector rail 142 is non-magnetic, etc.

The exemplary implementation of the magnetic component 158 is a discrete component from a body of the carriage 140 that is held by the body of the carriage 140 using any suitable method, means, fastener, and/or the like (e.g., adhesive, a weld, a braze, a threaded fastener, an interference fit, a clearance fit, a transition fit, a snap fit, a clip, a latch, etc.). In other examples, the magnetic component 158 is defined by at least a portion of the body of the carriage 140. For example, one or more segments of the body of the carriage 140 may define the magnetic component 158 while the remainder of the body of the carriage 140 is non-magnetic, etc.

Various parameters of the magnetic components 156 and 158 can be selected to enable the magnetic attraction therebetween to releasably hold the carriage 140 and tray table 100 in the partially-extended position, such as, but not limited to, the strength of the magnet(s) of the magnetic components 156 and/or 158, the distance between the magnetic components 156 and 158 when the carriage 140 and tray table 100 are in the partially-extended position, and/or the like. Each magnet of the magnetic component 156 and/or the magnetic component 158 may have any number of poles that enable the magnetic components 156 and 158 to function as disclosed herein (e.g., be magnetically attracted to each other, to releasably hold the carriage 140 in the partially-extended position, etc.). Examples of the number of poles of a magnet of the magnetic component 156 and/or the magnetic component 158 include, but are not limited to, a single pole, two poles, four poles, six poles, eight poles, ten poles, an even number of poles greater than ten poles, and/or the like.

In some implementations, the magnetic detent 144 is configured to generate an audible and/or tactile indication when the carriage 140, and thus the tray table 100, moves into the partially-extended position. Specifically, the magnetic components 156 and 158 of the magnetic detent 144 are configured in one implementation to cooperate to generate an audible and/or tactile indication that indicates that the carriage 140 and tray table 100 have moved into the partially-extended position. For example, friction generated via sliding engagement of the magnetic components 156 and 158 with each other as the carriage 140 moves into the partially-extended position may generate a snap action that emits an audible and/or tactile indication that the carriage 140 and tray table 100 have moved into the partially-extended position. In another example, the rate at which the magnetic components 156 and 158 are drawn together into alignment with each other once within the predetermined distance of each other is selected (e.g., via the size and/or strength of the magnetic components 156 and/or 158, via the number and/or configuration of the poles of the magnetic components 156 and/or 158, etc.) to provide force feedback that generates an audible and/or tactile indication that the carriage 140 and tray table 100 have moved into the partially-extended position. In another example, the increase in resistance to further movement of the carriage 140 generated when the magnetic components 156 and 158 align with each other is selected (e.g., via the size and/or strength of the magnetic components 156 and/or 158, via the number and/or configuration of the poles of the magnetic components 156 and/or 158, etc.) to provide force feedback that generates an audible and/or tactile indication that the carriage 140 and tray table 100 have moved into the partially-extended position.

In some implementations, a four-pole configuration provides a greater attraction force between the magnetic components 156 and 158 at smaller distances (e.g., the distance between the magnetic components 156 and 158 when the carriage 140 and tray table 100 are in the partially-extended position, etc.), while the four-pole configuration provides a reduced attraction force between the magnetic components 156 and 158 at greater distances (e.g., the distance between the magnetic components 156 and 158 as the carriage 140 and tray table 100 are moved away from or toward the partially-extended position thereof, etc.). In this way, a four-pole configuration facilitates generating force feedback that generates an audible and/or tactile indication as the carriage 140 and tray table 100 move into the partially-extended position.

As briefly described above, in some implementations the detent mechanism 106 includes a mechanical latch mechanism 146. The latch mechanism 146 is configured to releasably hold the connector rail 142 in the extended position (shown in FIGS. 4 and 6) of the connector rail 142 that corresponds to the partially-extended position of the carriage 140 and tray table 100. In the exemplary implementation, the latch mechanism 146 includes a latch member 160 of the connector rail 142 and a latch catch 162 of the base plate 136. In other words, the connector rail 142 includes the latch member 160 and the base plate 136 includes the latch catch 162.

The latch member 160 and the latch catch 162 are configured to interlock with each other. Specifically, the latch member 160 and the latch catch are configured to interlock with each other as the connector rail 142 moves into the extended position of the connector rail 142. For example, the latch member 160 and the latch catch 162 are positioned at respective locations along the connector rail 142 and the base plate 136 such that the latch member 160 and the latch catch 162 are at least partially aligned along the longitudinal axis 116 when the connector rail 142 is in the extended position thereof. Accordingly, when the connector rail 142 is in the extended position, the interlock between the latch member 160 and the latch catch 162 releasably holds the connector rail 142 in the extended position thereof. In the exemplary implementation, the latch member 160 is positioned at the end portion 148 of the connector rail 142, but the latch member 160 and the latch catch 162 each may have any other location along the connector rail 142 and the base plate 136, respectively, that enable the mechanical latch mechanism 146 to function as described and/or illustrated herein (e.g., to releasably hold the connector rail 142 in the extended position thereof, etc.).

In the exemplary implementation, the latch member 160 and the latch catch 162 interlock with each other with a snap-fit connection. But, the latch mechanism 146 is not limited to a snap-fit connection. Rather, the latch member 160 and the latch catch 162 additionally or alternatively interlock with each other using any other type of connection (e.g., an interference fit, etc.) that enables the mechanical latch mechanism 146 to function as described and/or illustrated herein (e.g., to releasably hold the connector rail 142 in the extended position thereof, etc.).

In operation, and referring now to FIGS. 4-6, as the user moves (e.g., pulls, pushes, etc.) the carriage 140 of the tray table 100 in the direction 134 from the retracted position of the carriage 140 and tray table 100 (also referred to as the stowed position of the tray table 100) shown in FIG. 5 toward the extended position thereof, the connector rail 142 moves along with the carriage 140 (relative to the base plate 136) in the direction 134. For example, stiction between the connector rail 142 and the guide 154 (shown in FIG. 7) of the carriage 140 may be sufficient to pull the connector rail 142 along with the carriage 140 in the direction 134. When the connector rail 142 reaches the extended position thereof, the latch member 160 interlocks with the latch catch 162 to releasably hold the connector rail 142 in the extended position of the connector rail 142. As the carriage 140 is moved further in the direction 134, the carriage 140 moves (e.g., slides, etc.) along the longitudinal axis 116 relative to the connector rail 142 (in the direction 134) into the partially-extended position of the carriage 140 and tray table 100 shown in FIG. 6. As the carriage 140 reaches the partially-extended position thereof, the magnetic components 156 and 158 of the magnetic detent 144 align along the longitudinal axis 116 and thereby magnetically interlock with each other to releasably hold the carriage 140 and tray table 100 in the partially-extended position, for example as is shown in FIG. 6.

As described above, in some implementations, the magnetic components 156 and 158 of the magnetic detent 144 generate an audible and/or tactile indication when the carriage 140 moves into the partially-extended position. The audible and/or tactile indication generated by the magnetic components 156 and 158 as the carriage 140 moves into the partially-extended position informs (e.g., reassures, etc.) the user that the tray table 100 has been successfully moved into the partially-extended position. The tactile and/or audible indication generated by the magnetic detent 144 improves the user's experience, for example by providing a satisfying feel (e.g., a feeling of quality, etc.) of the movement of the tray table 100 into the partially-extended position, by providing a tray table 100 that is more intuitive to use, etc.

From the partially-extended position shown in FIG. 6, the carriage 140, and thereby the tray table 100, can be moved to the extended position of the carriage 140 and tray table 100 shown in FIG. 4. Specifically, the carriage 140 can be moved in the direction 134 with sufficient force to overcome the magnetic attraction between the magnetic components 156 and 158 and thereby enable the carriage 140 to move relative to the connector rail 142 in the direction 134 into the extended position of the carriage 140 and tray table 100. As should be apparent from a comparison of FIGS. 4 and 6, the mechanical latch mechanism 146 holds the connector rail 142 in the extended position thereof as the carriage 140 moves relative to the connector rail 142 from the partially-extended position of the carriage 140 and tray table 100 toward and into the extended position of the carriage 140 and tray table 100.

From the extended position of the carriage 140 and tray table 100, the carriage 140, and thereby the tray table 100, can be moved back to the partially-extended position thereof by moving (e.g., pushing, pulling, etc.) the carriage 140 in the direction 132 until the magnetic components 156 and 158 align and thereby magnetically interlock. The mechanical latch mechanism 146 holds the connector rail 142 in the extended position thereof as the carriage 140 moves relative to the connector rail 142 from the extended position of the carriage 140 and tray table 100 toward and into the partially-extended position of the carriage 140 and tray table 100.

From the partially-extended position of the carriage 140 and tray table 100, the carriage 140 can be moved in the direction 132 with sufficient force to overcome the magnetic attraction between the magnetic components 156 and 158 and thereby enable the carriage 140 to move relative to the connector rail 142 in the direction 132 toward the retracted position of the carriage 140 shown in FIG. 5. As the carriage 140 moves relative to the connector rail 142 in the direction 132 from the partially-extended position of the carriage 140 toward the retracted position thereof, the mechanical latch mechanism 146 holds the connector rail 142 in the extended position. Once the carriage 140 moves sufficiently relative to (e.g., along, etc.) the connector rail 142 in the direction 132, the carriage 140 engages a stop 164 of the connector rail 142. In the exemplary implementation, the stop 164 is defined by an end surface of a channel 166 of the connector rail 142 and the carriage 140 includes a pin 168 that rides within the channel 166 and engages the end surface of the channel 166, but any other mechanism may additionally or alternatively be used. Once engaged with the stop 164, the carriage 140 can be moved further in the direction 132 with sufficient force to overcome the mechanical interlock between the latch member 160 and the latch catch 162 of the latch mechanism 146 (e.g., to release, or unlatch, the latch mechanism 146) and thereby enable the carriage 140 to move further in the direction 132 into the retracted (i.e., stowed) position of the carriage 140 and tray table 100. As the carriage 140 moves in the direction 132 into the retracted position thereof, the connector rail 142 moves along with the carriage 140 (e.g., via engagement of the carriage 140 and stop 164, via stiction between the guide 154 and connector rail 142, etc.) into the retracted position of the connector rail 142 shown in FIG. 5.

In some implementations, the magnetic components 156 and 158 of the magnetic detent 144 generate an audible and/or tactile indication when the carriage 140 is released from the partially-extended position, which informs (e.g., reassures, etc.) the user that the tray table 100 has been successfully moved out of the partially-extended position.

Figure 8:
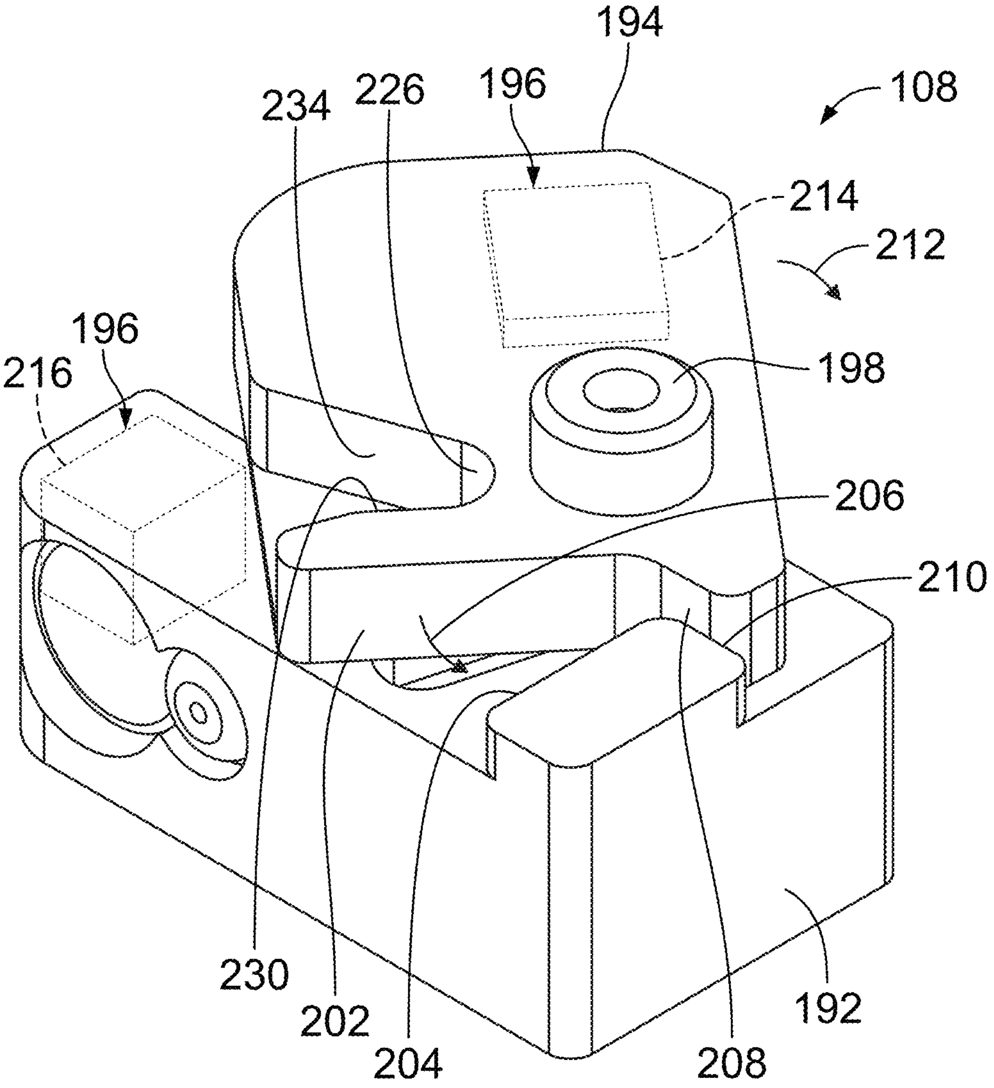
FIG. 8 illustrates a perspective view of a detent mechanism according to an implementation.
Figure 10:
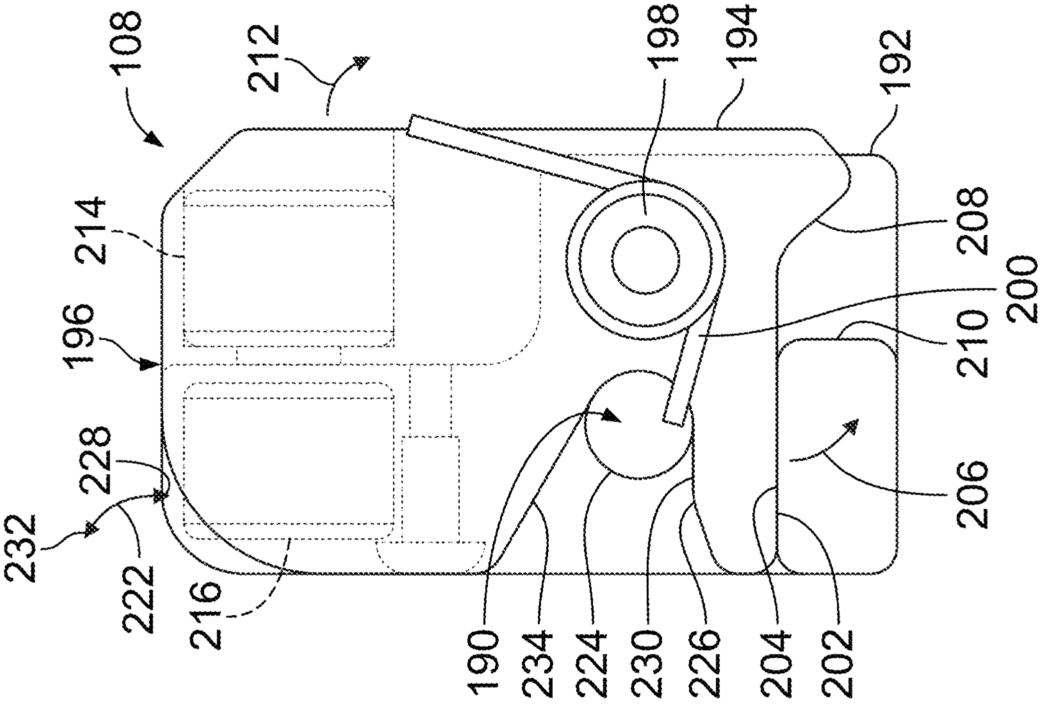
FIG. 10 illustrates a plan view of the detent mechanism shown in FIG. 8 illustrating the detent mechanism in a closed position according to an implementation.
Figure 9:
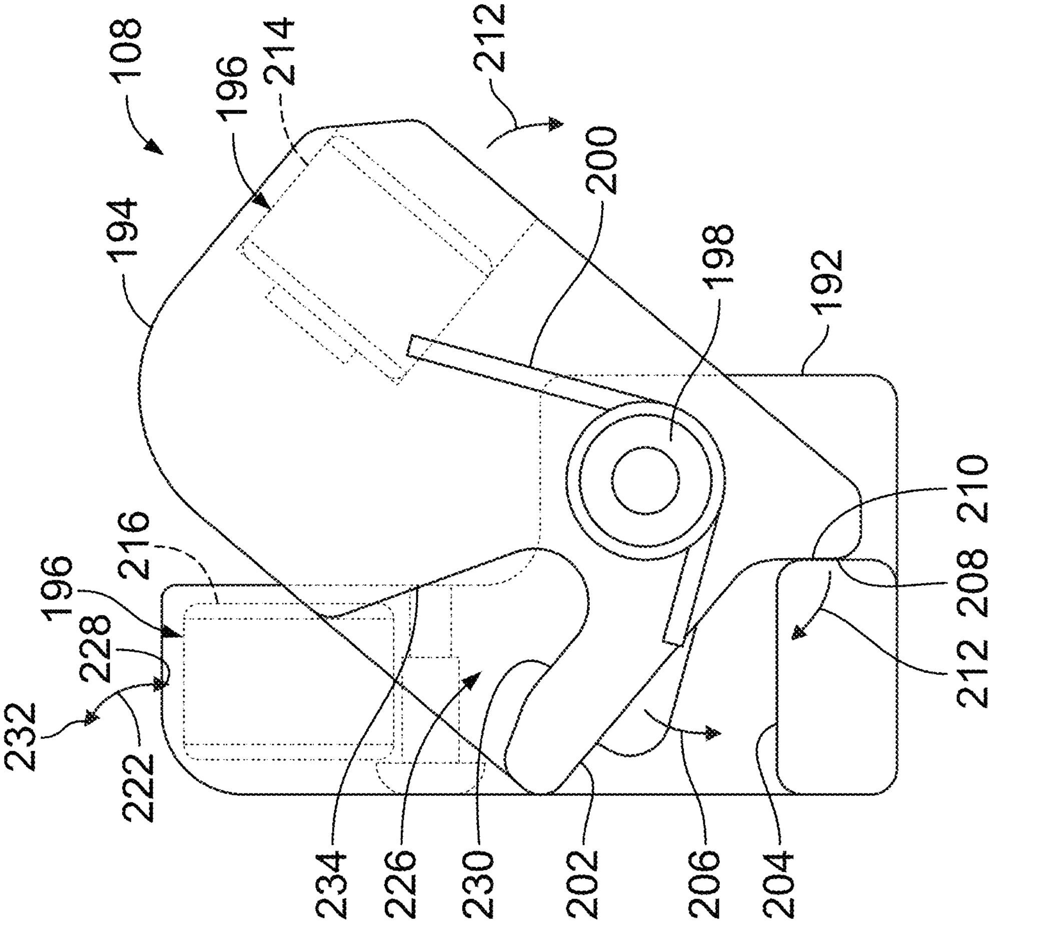
FIG. 9 illustrates a plan view of the detent mechanism shown in FIG. 8 illustrating the detent mechanism in an open position according to an implementation.

Referring now to FIGS. 8-10, the detent mechanism 108 of the tray table 100 will now be described. The detent mechanism 108 includes an actuator 190 (not shown in FIGS. 8 and 9), a base 192, a follower 194, and a magnetic detent 196. In some implementations, the base 192 is mounted to the carriage 140 (see FIGS. 4-7, 11, and 12), while in other implementations the base 192 is integrally formed as a single unitary structure with the carriage 140. The follower 194 is mounted to the base 192 such that the follower 194 is moveable relative to the carriage 140 between an open position and a closed position of the follower 194. The open position of the follower 194 is shown in FIG. 9, while the closed position of the follower 194 is shown in FIG. 10. As will be described below, the open position of the follower 194 corresponds to the stowed position of the table leaf 104 (see FIGS. 1-3, 11, and 12). In other words, the follower 194 is in the open position when the table leaf 104 is in the stowed position. The closed position of the follower 194 corresponds to the deployed position of the table leaf 104 (i.e., the follower 194 is in the closed position when the table leaf 104 is in the deployed position).

In the exemplary implementation, the follower 194 is configured to rotate (e.g., pivot, etc.) between the open and closed positions. For example, the follower 194 is shown in the exemplary implementation as being rotatably mounted to the base 192 via a pin 198 for rotation about a central longitudinal axis of the pin 198 between the open and closed positions. The detent mechanism 108 is not limited to the pin 198 for enabling the rotational movement of the follower 194. Rather, in addition or alternative to the pin 198, the follower 194 may be rotatably mounted to the base 192 using any other structure (e.g., a bearing, etc.) that enables the follower 194 to function as described and/or illustrated herein (e.g., enables, facilitates, and/or the like rotational motion of the follower 194 between the open and closed positions, etc.). In other implementations, the follower 194 moves with linear motion between the open and closed positions thereof in addition or alternatively to the rotational movement shown herein.

In some implementations, the follower 194 is biased toward the open position thereof. For example, the detent mechanism 108 includes a biasing mechanism 200 (not shown in FIG. 8) operatively connected to the follower 194 (e.g., operatively connected between the follower 194 and the base 192, operatively connected between the follower 194 and another location along the carriage 140, etc.) such that the biasing mechanism 200 is configured to bias the follower 194 toward the open position of the follower 194. The biasing mechanism 200 may include any structure, type of biasing mechanism, and/or the like that enables the biasing mechanism 200 to function as described and/or illustrated herein. In the exemplary implementation of the biasing mechanism 200, the biasing mechanism 200 includes a helical torsion spring operatively connected around the pin 198. But, the biasing mechanism 200 may additionally or alternatively include any other type of spring (e.g., a coil spring, a torsion bar, a leaf spring, etc.) and/or another type of biasing mechanism. Moreover, the biasing mechanism 200 may be operatively connected to the follower 194 using any other configuration, arrangement, and/or the like in addition or alternative to the exemplary configuration shown herein.

In some implementations, the follower 194 and the base 192 include respective stops 202 and 204 that are configured to cooperate to prevent the follower 194 from moving past the closed position of the follower 194. For example, as shown in FIG. 10, the stops 202 and 204 are configured to engage each other when the follower 194 is in the closed position such that the follower 194 is prevented from rotating further in the direction of the arrow 206. As will be described below, the stops 202 and 204 thereby cooperate to prevent the table leaf 104 from rotating past the deployed position of the table leaf 104. Each of the stops 202 and 204 may be referred to herein as a "first" and/or a "second" stop.

Optionally, the follower 194 and the base 192 include respective stops 208 and 210 that are configured to cooperate to prevent the follower 194 from moving past the open position of the follower 194. For example, as shown in FIG. 9, the stops 208 and 210 are configured to engage each other when the follower 194 is in the open position such that the follower 194 is prevented from rotating further in the direction of the arrow 212. Each of the stops 208 and 210 may be referred to herein as a "first" and/or a "second" stop.

As briefly described above, the detent mechanism 108 includes a magnetic detent 196. The magnetic detent 196 is configured to releasably hold the follower 194 in the closed position of the follower 194. As will be described below, by releasably holding the follower 194 in the closed position thereof, the magnetic detent 196 is configured to releasably hold the table leaf 104 of the tray table 100 in the deployed position of the table leaf 104. The magnetic detent 196 includes magnetic components 214 and 216 of the follower 194 and the base 192, respectively, that cooperate to releasably hold the follower 194 in the closed position. In other words, the follower 194 includes the magnetic component 214 and the base 192 includes the magnetic component 216. Each of the magnetic components 214 and 216 may be referred to herein as a "first" and/or a "second" magnetic component.

The magnetic components 214 and 216 are each configured such that the magnetic components 214 and 216 are magnetically attracted to each other. For example, in some implementations at least one of the magnetic components 214 or 216 includes one or more magnets that generates a magnetic field that is configured to magnetize a ferromagnetic material of the other magnetic component 214 or 216 when the magnetic components 214 and 216 are within a defined (e.g., predetermined) distance from each other. In some implementations, and for example, each of the magnetic components 214 and 216 includes one or more magnets that are magnetically attracted to each other when within the predetermined distance of each other. Each of the magnetic components 214 and 216 may include any number of magnets.

As briefly described above, the magnetic components 214 and 216 cooperate with each other to releasably hold the follower 194 in the closed position. For example, and as is shown in FIG. 10, the magnetic components 214 and 216 are positioned at respective locations along the follower 194 and the base 192 such that the magnetic components 214 and 216 are at least partially aligned with each other (e.g., as shown in FIG. 10, etc.), and thereby within the predetermined distance of each other, when the follower 194 is in the closed position. Accordingly, when the follower 194 is in the closed position, the magnetic attraction between the magnetic components 214 and 216 releasably holds the follower 194 in the closed position. As will be described below, by releasably holding the follower 194 in the closed position, the magnetic attraction between the magnetic components 214 and 216 releasably holds the table leaf 104 in the deployed position.

In the exemplary implementation, the magnetic component 214 is a discrete component from a body of the follower 194 that is held by the body of the follower 194 using any suitable method, means, fastener, and/or the like (e.g., adhesive, a weld, a braze, a threaded fastener, an interference fit, a clearance fit, a transition fit, a snap fit, a clip, a latch, etc.). In other examples, the magnetic component 214 is defined by at least a portion of the body of the follower 194. For example, one or more segments of the body of the follower 194 may define the magnetic component 214 while the remainder of the body of the follower 194 is non-magnetic, etc.

The exemplary implementation of the magnetic component 216 is a discrete component from a body of the base 192 that is held by the body of the base 192 using any suitable method, means, fastener, and/or the like (e.g., adhesive, a weld, a braze, a threaded fastener, an interference fit, a clearance fit, a transition fit, a snap fit, a clip, a latch, etc.). In other examples, the magnetic component 216 is defined by at least a portion of the body of the base 192. For example, one or more segments of the body of the base 192 may define the magnetic component 216 while the remainder of the body of the base 192 is non-magnetic, etc.

Various parameters of the magnetic components 214 and 216 can be selected to enable the magnetic attraction therebetween to releasably hold the follower 194 in the closed position and thereby the table leaf 104 in the deployed position, such as, but not limited to, the strength of the magnet(s) of the magnetic components 214 and/or 216, the distance between the magnetic components 214 and 216 when the follower 194 is in the closed position, and/or the like. Each magnet of the magnetic component 214 and/or the magnetic component 216 may have any number of poles that enable the magnetic components 214 and 216 to function as disclosed herein (e.g., be magnetically attracted to each other, to releasably hold the follower 194 in the closed position and the table leaf 104 in the deployed position, etc.). Examples of the number of poles of a magnet of the magnetic component 214 and/or the magnetic component 216 include, but are not limited to, a single pole, two poles, four poles, six poles, eight poles, ten poles, an even number of poles greater than ten poles, and/or the like.

In some implementations, the magnetic detent 196 is configured to generate an audible and/or tactile indication when the follower 194 moves into the closed position (and thus when the table leaf 104 moves into the deployed position). Specifically, the magnetic components 214 and 216 of the magnetic detent 196 may be configured to cooperate to generate an audible and/or tactile indication that indicates that the follower 194 and table leaf 104 have moved into the respective closed and deployed positions. For example, friction generated via sliding engagement of the magnetic components 214 and 216 with each other as the follower 194 moves into the closed position may generate a snap action that emits an audible and/or tactile indication that the follower 194 and table leaf 104 have moved into the closed and deployed positions, respectively. In another example, the rate at which the magnetic components 214 and 216 draw the stops 202 and 204 into engagement with each other may generate a snap action that emits an audible and/or tactile indication that the follower 194 and table leaf 104 have moved into the respective closed and deployed positions. In another example, the rate at which the magnetic components 214 and 216 are drawn together into alignment with each other once within the predetermined distance of each other is selected (e.g., via the size and/or strength of the magnetic components 214 and/or 216, via the number and/or configuration of the poles of the magnetic components 214 and/or 216, etc.) to provide force feedback that generates an audible and/or tactile indication that the follower 194 and table leaf 104 are in the respective closed and deployed positions.

In some implementations, a four-pole configuration provides a greater attraction force between the magnetic components 214 and 216 at smaller distances (e.g., the distance between the magnetic components 214 and 216 when the follower 194 is in the closed position, etc.), while the four-pole configuration provides a reduced attraction force between the magnetic components 214 and 216 at greater distances (e.g., the distance between the magnetic components 214 and 216 as the follower 194 is moved away from or toward the closed position thereof, etc.). In this way, a four-pole configuration facilitates generating force feedback that generates an audible and/or tactile indication as the follower 194 and table leaf 104 move into the respective closed and deployed positions.

Movement of the follower 194 from the open position shown in FIG. 9 to the closed position shown in FIG. 10 is driven by rotation of the table leaf 104 of the tray table 100 into the deployed position of the table leaf 104. Specifically, the follower 194 is configured to be moved, against the bias to the open position provided by the biasing mechanism 200, from the open position into the closed position by engagement of the actuator 190 with the follower 194 as the table leaf 104 rotates from the stowed position of the table leaf 104 into the deployed position of the table leaf 104.

Figure 11:
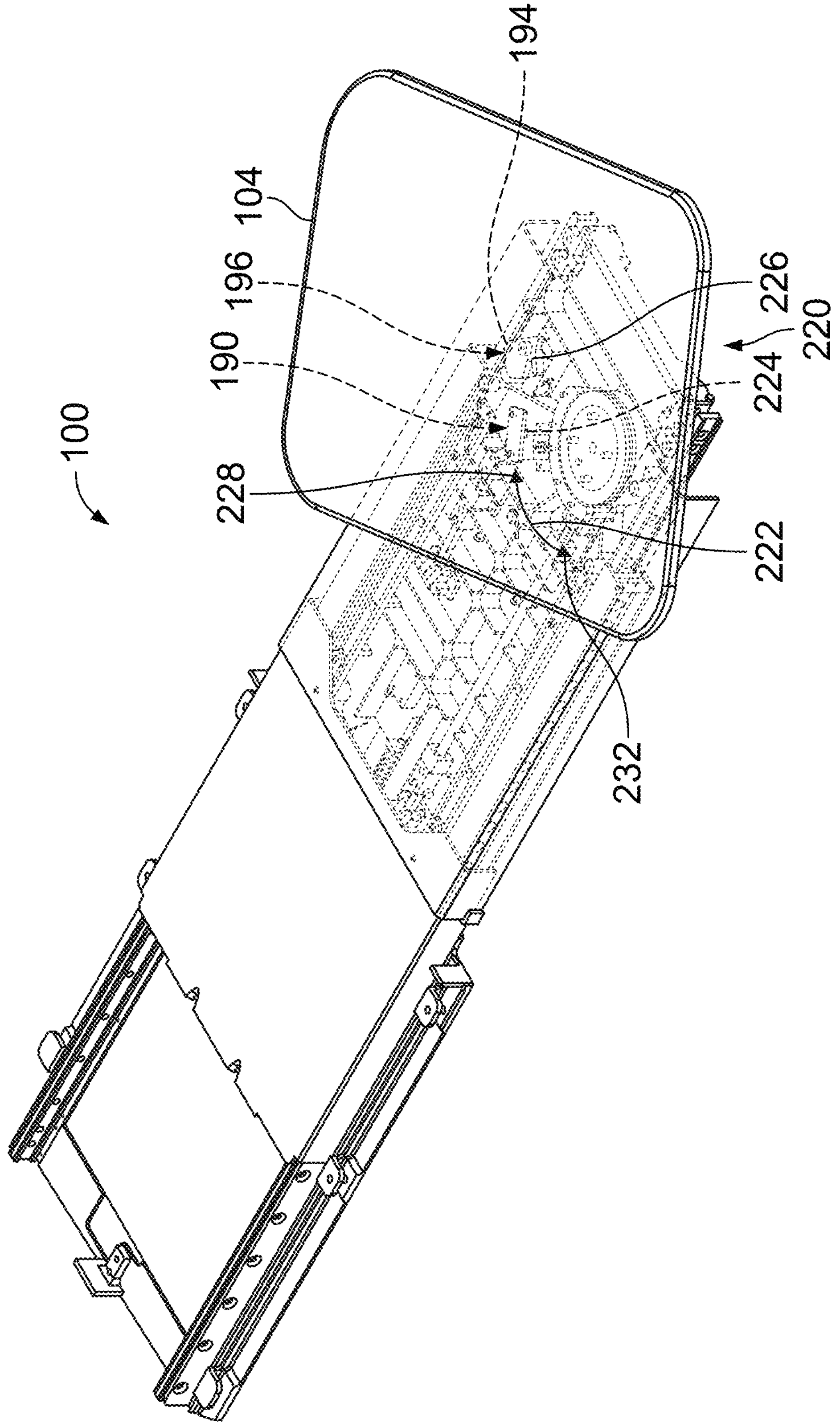
FIGS. 11 and 12 illustrate perspective views of the tray table shown in FIGS. 1-3 illustrating operation of the detent mechanism shown in FIGS. 8-10 according to an implementation.
Figure 12:
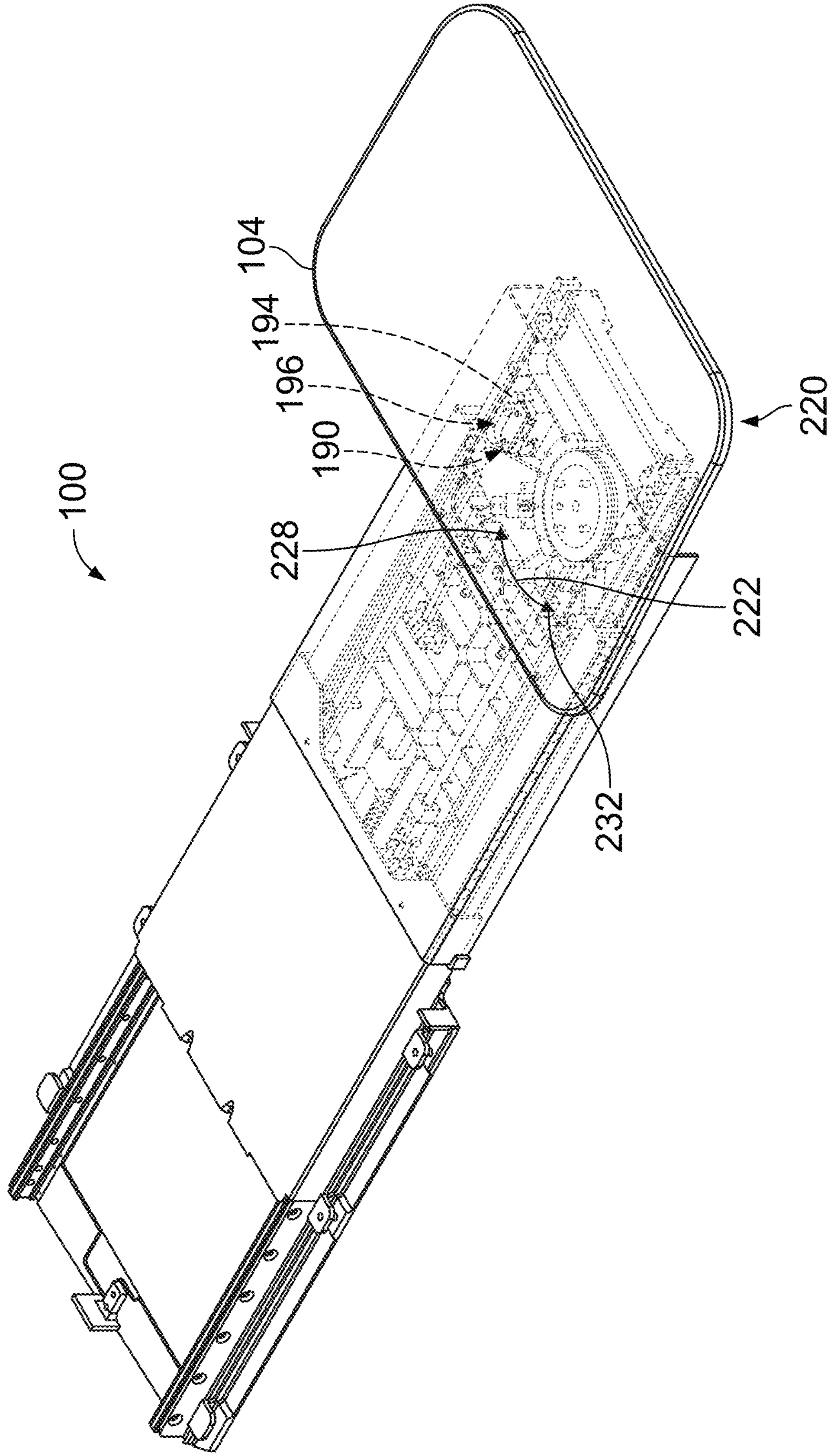

Referring now to FIGS. 11 and 12, the actuator 190 is mounted to an underside 220 of the table leaf 104 such that the actuator 190 is configured to move along with the table leaf 104 as the table leaf 104 rotates between the stowed position and the deployed position (shown in FIG. 12) thereof. For example, the actuator 190 is mounted to the table leaf 104 such that the actuator 190 moves along an arc 222 as the table leaf 104 rotates along the arc 222 between the stowed and deployed positions of the table leaf 104. In the exemplary implementation, the actuator 190 includes a pin 224 (not visible in FIG. 12) at which the actuator 190 is configured to engage the follower 194 to move the follower 194 from the open position into the closed position. In other words, the actuator 190 is configured to engage the follower 194 with the pin 224. But, the actuator 190 is not limited to the pin 224. Rather, in addition or alternatively to the pin 224, the actuator 190 includes any other structure that enables the actuator 190 to function as described and/or illustrated herein (e.g., to move the follower 194 from the open position into the closed position, etc.).

Referring again to FIG. 8-10, in the exemplary implementation of the detent mechanism 108, the follower 194 includes a channel 226 within which the actuator 190 (not shown in FIGS. 8 and 9) engages the follower 194. In other words, the actuator 190 is configured to engage the follower 194 within the channel 226. In the exemplary implementation, the pin 224 (not shown in FIGS. 8 and 9) is configured to be received within the channel 226 as the table leaf 104 (see FIGS. 1-3, 11, and 12) and rotates from the stowed position toward the deployed position. As the table leaf 104 rotates into the deployed position, engagement of the pin 224 with the follower 194 within the channel 226 moves the follower 194 from the open position to the closed position. For example, as the pin 224 moves along the arc 222 (not shown in FIG. 8) in the direction of the arrow 228 when the table leaf 104 rotates toward the deployed position, engagement of the pin 224 with a side surface 230 of the channel 226 moves the follower 194 in the direction 206 toward the closed position thereof. As will be described below, as the pin 224 moves along the arc 222 in the direction of the arrow 232 when the table leaf 104 rotates toward the stowed position, engagement of the pin 224 with a side surface 234 of the channel 226 may facilitate moving (e.g., in addition or alternative to the biasing force provided by the biasing mechanism 200, etc.) the follower 194 in the direction 212 toward the open position thereof The configuration, arrangement, operation, and/or the like of the pin 224 and the channel 226 shown and described herein is meant as exemplary only. The detent mechanism 108 may additionally or alternatively include any other structure, configuration, arrangement, components, operation, and/or the like that enables the detent mechanism 108 to function as described and/or illustrated herein.

In operation, and referring now to FIGS. 8-12, as the user rotates the table leaf 104 along the arc 222 in the direction 228 from the stowed position (shown in FIG. 3B) toward the deployed position (shown in FIG. 12) of the table leaf 104, the pin 224 of the actuator 190 enters (e.g., is received into) the channel 226 of the follower 194. As the table leaf 104 is rotated further in the direction 228 into the deployed position of the table leaf 104, the pin 224 engages the side surface 230 of the channel 226 such that the pin 224 moves the follower 194 in the direction 206, against the bias of the biasing mechanism 200, from the open position shown in FIGS. 8, 9, and 11 into the closed position shown in FIGS. 10 and 12. As the follower 194 reaches the closed position thereof, the magnetic components 214 and 216 of the magnetic detent 196 align and thereby magnetically interlock with each other. When magnetically interlocked with each other, the magnetic components 214 and 216 releasably hold the follower 194 in the closed position against the bias of the biasing mechanism 200, for example as is shown in FIGS. 10 and 12.

By releasably holding the follower 194 in the closed position thereof, the magnetic detent 196 is configured to releasably hold the table leaf 104 of the tray table 100 in the deployed position of the table leaf 104. For example, and referring now solely to FIG. 10, the closed position of the follower 194 prevents the pin 224 from moving in the direction 232 without overcoming the magnetic interlock between the magnetic components 214 and 216 (i.e., the pin 224 would have to overcome the magnetic interlock between the magnetic components 214 and 216 to move in the direction 232). Accordingly, when the follower 194 is in the closed position, the magnetic detent 196 releasably holds the table leaf 104 of the tray table 100 in the deployed position thereof.

As described above, in some implementations, the magnetic components 214 and 216 of the magnetic detent 196 generate an audible and/or tactile indication when the follower 194 moves into the closed position. The audible and/or tactile indication generated by the magnetic components 214 and 216 as the follower 194 moves into the closed position informs (e.g., reassures, etc.) the user that the table leaf 104 has been successfully moved into the deployed position. The tactile and/or audible indication generated by the magnetic detent 196 improves the user's experience, for example by providing a satisfying feel (e.g., a feeling of quality, etc.) of the movement of the table leaf 104 into the deployed position, by providing a tray table 100 that is more intuitive to use, etc. Moreover, the tactile and/or audible indication generated by the magnetic detent 196 may prevent the user from mishandling the table leaf 104 (e.g., attempting to rotate the table leaf 104 past the deployed position, etc.). The tactile and/or audible indication generated by the magnetic detent 196 thereby prevent, or reduce the likelihood of, damage to and/or wearing of the tray table 100, which reduces maintenance costs (for example as compared to at least some known tray tables).

In some implementations, the stops 202 and 204 of the follower 194 and the base 192, respectively, prevent the table leaf 104 from being rotated past the deployed position and thereby may prevent the user from mishandling the table leaf 104 by attempting to rotate the table leaf 104 past the deployed position. The stops 202 and 204 thereby prevent, or reduce the likelihood of, damage to and/or wearing of the tray table 100, which reduces maintenance costs (for example as compared to at least some known tray tables).

In some implementations, the magnetic attraction between magnetic components 214 and 216 is configured to move the follower 194 into the closed position. For example, the attractive force of the magnetic components 214 and 216 being drawn together as the magnetic components 214 and 216 move into alignment with each other may reduce the force required by the user to complete movement of the table leaf 104 into the deployed position.

To move the table leaf 104 from the deployed position to the stowed position of the table leaf 104, the user rotates the table leaf 104 along the arc 222 in the direction 232. As the table leaf rotates in the direction 232 from the deployed position toward the stowed position, engagement between the pin 224 of the actuator 190 and the side surface 234 of the channel 226 applies a force to the follower 194 that, along with the bias of the biasing mechanism 200, overcomes the magnetic attraction between the magnetic components 214 and 216 and moves the follower 194 in the direction 212 from the closed position toward the open position. As the table leaf 104 rotates further in the direction 232, the pin 224 is released from (i.e., exits) the channel 226 enabling the table leaf 104 to be further rotated into the stowed position. In some implementations, the stops 208 and 210 of the follower 194 and base 192, respectively, prevent the follower 194 from moving in the direction 212 past the open position thereof, which may prevent, or reduce the likelihood of, damage to and/or wearing of the detent mechanism 108.

In some implementations, the magnetic components 214 and 216 of the magnetic detent 196 generate an audible and/or tactile indication when the follower 194 is released from the closed position, which informs (e.g., reassures, etc.) the user that the table leaf 104 has been successfully moved out of the deployed position.

Although the detent mechanism 108 is described and illustrated herein with respect to a slide-out tray table (e.g., the tray table 100, etc.), the detent mechanism 108 is not limited to being used with slide-out tray tables. Rather, the detent mechanism 108 may be used with any other type of tray table, such as, but not limited to, fold-out tray tables, and/or the like.

Figure 13:
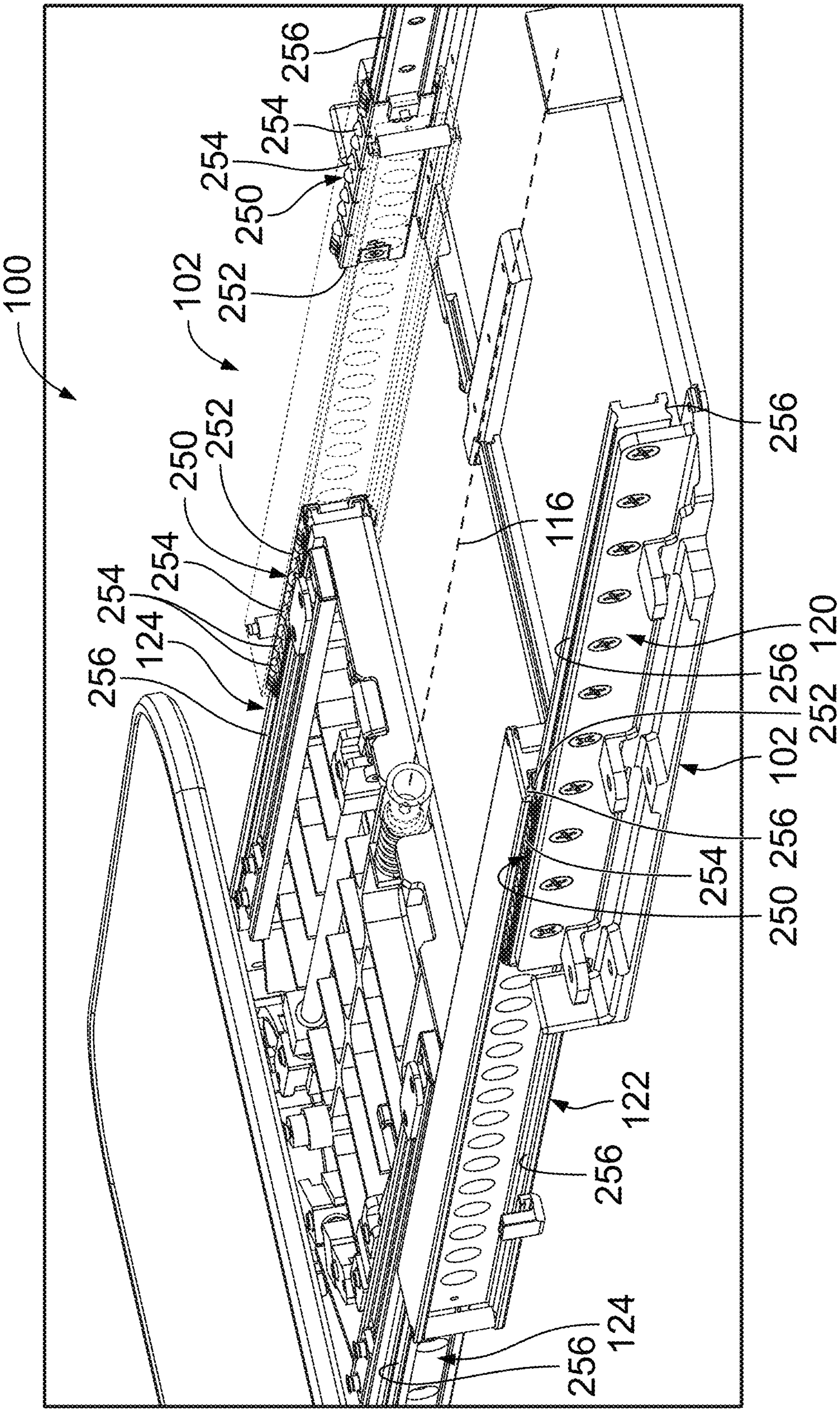
FIG. 13 illustrates a perspective view of a portion of the tray table shown in FIGS. 1-3.

Referring now to FIG. 13, in the exemplary implementation, the rail sets 120, 122, and 124 are slidably interconnected with each other using ball bearing assemblies 250 that enable the rail sets 120, 122, and 124 to slide relative to each other along the longitudinal axis 116 to thereby expand and retract the base 102 (and thus the tray table 100) along the longitudinal axis 116. For example, the exemplary ball bearing assemblies 250 include cages 252 that hold balls 254 between races 256 defined by the rails 120, 122, and 124. Other ball bearing arrangements, configurations, structures, geometries and/or the like may be used in addition or alternatively to the ball bearing assemblies 250.

Figure 14:
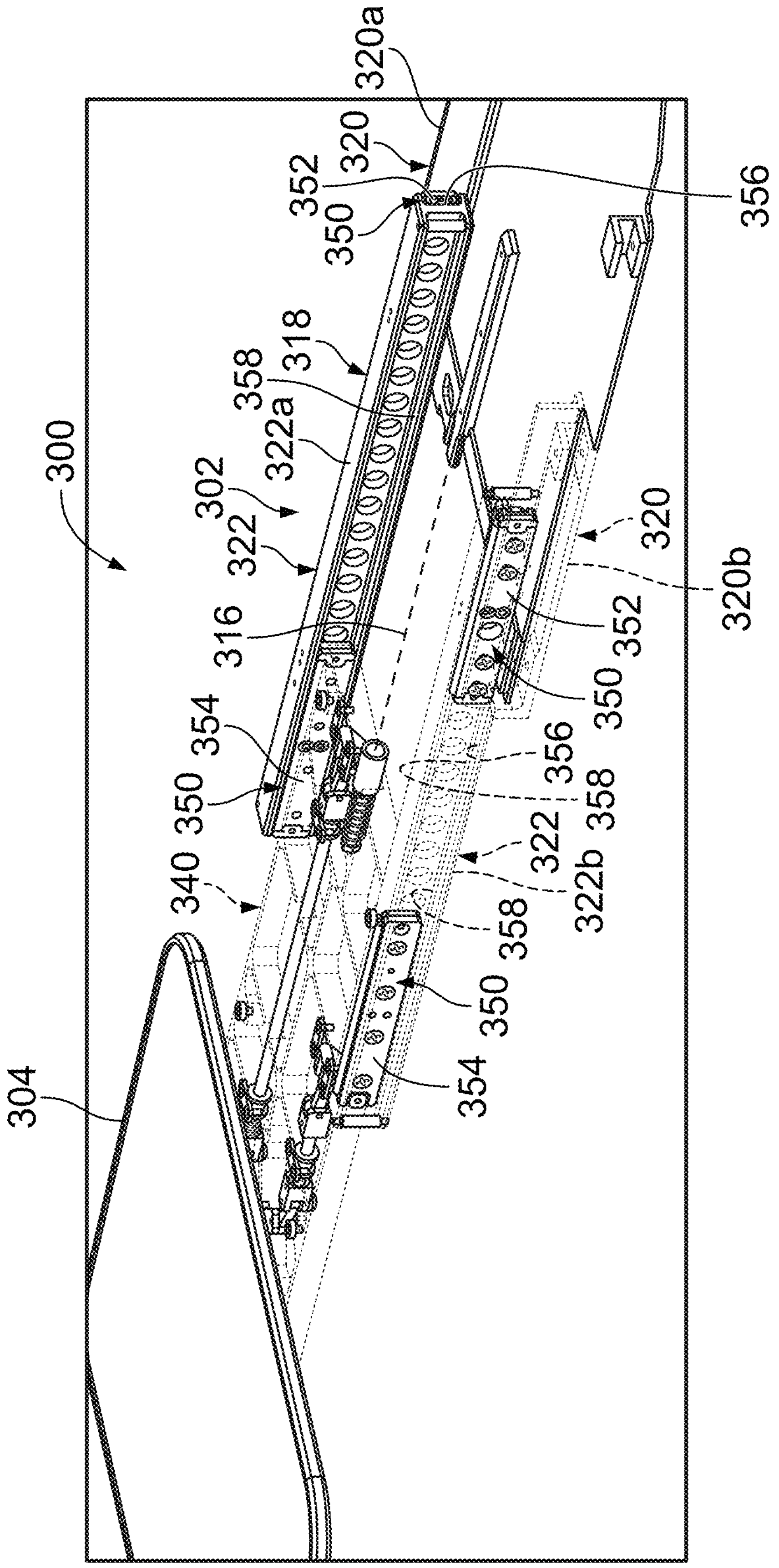
FIG. 14 illustrates a perspective view of a portion of a tray table according to another implementation.

Referring to FIG. 14, a tray table 300 includes a telescoping base 302 and a table leaf 304 mounted to the base 302. The tray table 100 is moveable between a stowed position (which may also be referred to herein as a "retracted position") and a deployed position. To move the tray table 300 to the deployed position (e.g., deploy the tray table 300 for use, etc.), the tray table 300 is moveable from the stowed position to an extended position of the tray table 300. For example, the base 302 of the tray table 300 is configured to telescope inwardly and outwardly along a longitudinal axis 316 to move the tray table 300 between the stowed position and the extended position. Specifically, the base 302 is configured to expand outwardly and retract inwardly along the longitudinal axis 316 between an extended position of the base 302 and a retracted position of the base 302. The retracted position of the base 302 corresponds to the stowed position of the tray table 300. The extended position of the base 302 corresponds to the extended position of the tray table 300. In other words, the base 302 of the tray table 300 is configured to expand outwardly and retract inwardly along the longitudinal axis 316 between the extended position of the tray table 300 and the stowed position of the tray table 300.

In the exemplary implementation of FIG. 14, the base 302 of the tray table 300 includes a telescopic rail system 318 having rail sets 320 and 322. The rail sets 320 and 322 are slidably interconnected with each other and a carriage 340 of the base 302 such that the rail sets 320 and 322 are configured to slide relative to each other and the carriage 340 along the longitudinal axis 316 to thereby expand and retract the base 302 (and thus the tray table 300) along the longitudinal axis 316. The exemplary implementation of the rail sets 320 and 322 are slidably interconnected with each other using slide block assemblies 350 that enable the rail sets 320 and 322 to slide relative to each other and the carriage 340 along the longitudinal axis 316 to thereby expand and retract the base 302 (and thus the tray table 300) along the longitudinal axis 316. For example, the exemplary slide block assemblies 350 include: slide blocks 352 that are mounted (e.g., rigidly, floating, etc.) to a corresponding rail 320*a* or 320*b* of the rail set 320 for movement therewith along the longitudinal axis 316; and slide blocks 354 that are mounted (e.g., rigidly, floating, etc.) to the carriage 340 for movement therewith along the longitudinal axis 316. Each slide block 352 and 354 is configured to slide within a corresponding channel 356 and 358, respectively, of a corresponding rail 322*a* or 322*b* of the rail set 322. Other slide block arrangements, configurations, structures, geometries and/or the like may be used in addition or alternatively to the slide block assemblies 350.

Figure 15:
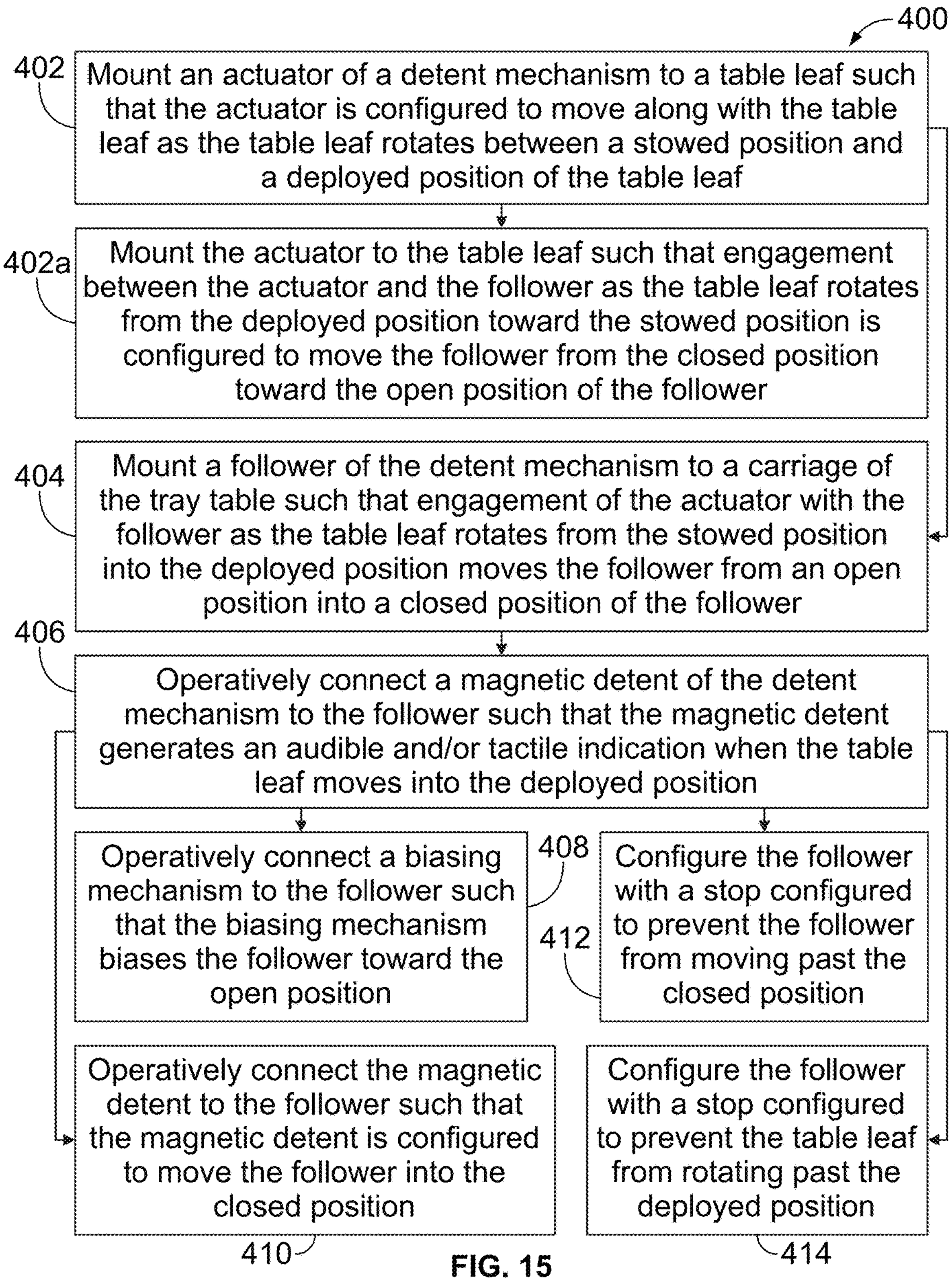
FIG. 15 illustrates a flow chart illustrating a method of configuring a tray table for an aircraft according to an implementation.

FIG. 15 illustrates a method 400 of configuring a tray table (e.g., the tray table 100 shown in FIGS. 1-12, etc.) for an aircraft (e.g., the aircraft 500 shown in FIG. 16, etc.) according to an implementation. The method 400 includes mounting, at 402, an actuator of a detent mechanism to a table leaf of the tray table such that the actuator is configured to move along with the table leaf as the table leaf rotates between a stowed position and a deployed position of the table leaf. At 404, the method 400 includes mounting a follower of the detent mechanism to a carriage of the tray table such that engagement of the actuator with the follower as the table leaf rotates from the stowed position into the deployed position moves the follower from an open position into a closed position of the follower. The method 400 further includes operatively connecting, at 406, a magnetic detent of the detent mechanism to the follower such that the magnetic detent generates at least one of an audible or a tactile indication when the table leaf moves into the deployed position.

In some implementations, mounting at 402 includes mounting, at 402*a*, the actuator of the detent mechanism to the table leaf such that engagement between the actuator and the follower as the table leaf rotates from the deployed position toward the stowed position is configured to move the follower from the closed position toward the open position of the follower.

Optionally, the method 400 includes operatively connecting, at 408, a biasing mechanism to the follower of the detent mechanism such that the biasing mechanism biases the follower toward the open position of the follower.

In some implementations, the method 400 includes operatively connecting, at 410, the magnetic detent of the detent mechanism to the follower such that the magnetic detent is configured to move the follower into the closed position.

In some implementations, the method 400 includes configuring, at 412, the follower with a stop configured to prevent the follower from moving past the closed position of the follower. Moreover, the method 400 optionally includes configuring, at 414, the follower with a stop configured to prevent the table leaf from rotating past the deployed position of the table leaf.

Figure 16:
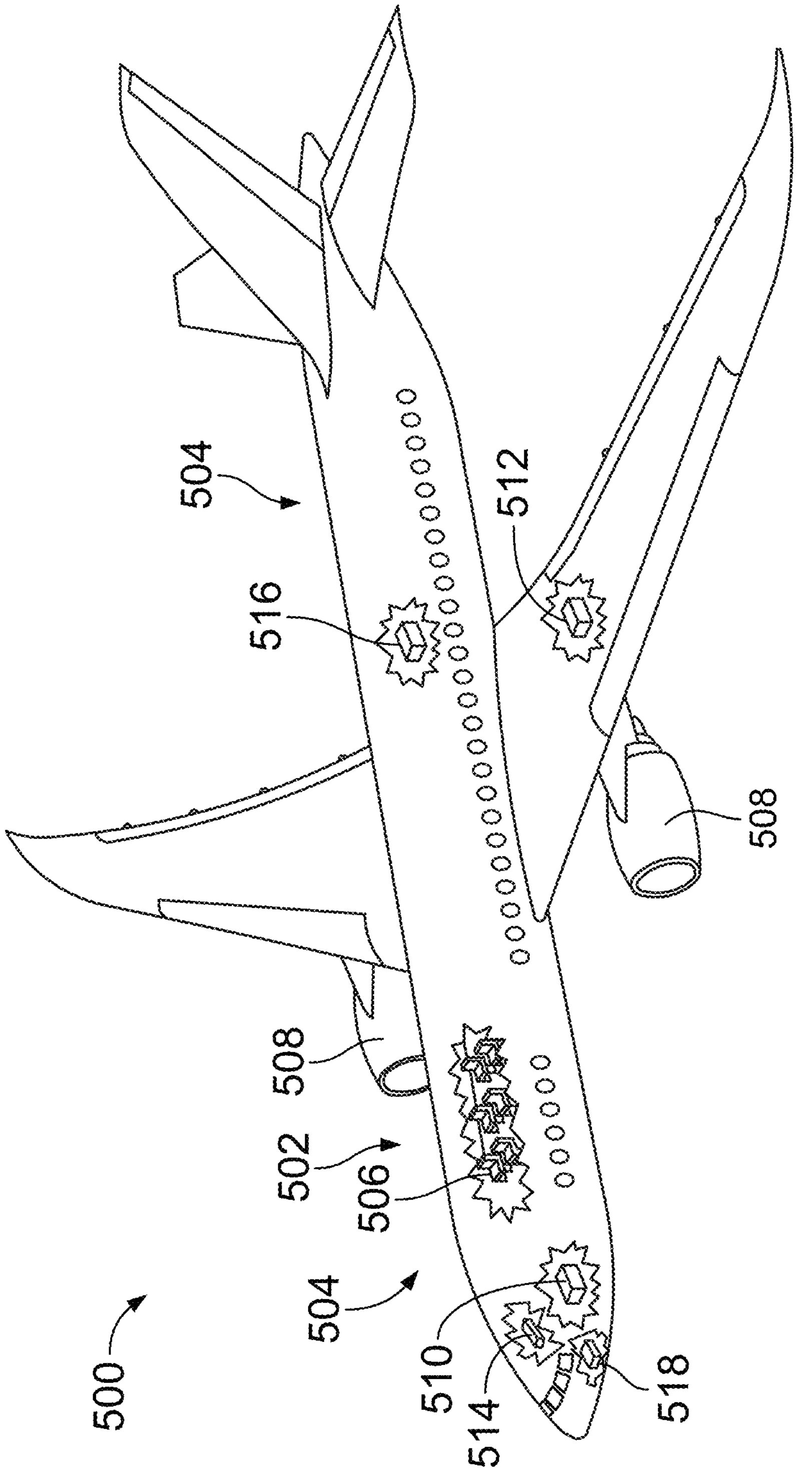
FIG. 16 illustrates a schematic view of an implementation of an aircraft.

Referring now to FIG. 16, examples of the present application may be described in the context of using the tray tables disclosed herein on an aircraft 500 that includes an airframe 502. The aircraft 500 includes a plurality of high-level systems 504 and an interior 506. Examples of high-level systems 504 include one or more of a propulsion system 508, an electrical system 510, a hydraulic fluid system 512, a control system 514, and an environmental system 516. Any number of other systems can be included. Although a fixed wing passenger aircraft is shown, the tray tables described and/or illustrated herein can be used with any other type of aircraft, such as, but not limited to, transport aircraft, military aircraft, rotorcraft (e.g., helicopters, etc.), lighter than air vehicles (e.g., balloons, etc.), and/or the like. Moreover, although an aerospace example is shown, the present application can be applied to other industries, such as, but not limited to, the automotive industry, the marine industry, etc.

The following clauses describe further aspects:

Clause Set A:

A1. A detent mechanism for a tray table of an aircraft, the detent mechanism comprising:

- an actuator configured to move along with a table leaf of the tray table as the table leaf rotates between a stowed position and a deployed position of the table leaf; and
- a follower biased toward an open position of the follower, the follower being configured to be moved against the bias from the open position into a closed position of the follower by engagement of the actuator with the follower as the table leaf rotates from the stowed position into the deployed position, the follower comprising a magnetic component configured to releasably hold the follower in the closed position.

A2. The detent mechanism of any preceding clause, wherein the magnetic component is configured to generate an audible indication when the follower moves into the closed position.

A3. The detent mechanism of any preceding clause, wherein the magnetic component of the follower is configured to cooperate with another magnetic component to generate an audible indication that indicates that the follower has moved into the closed position.

A4. The detent mechanism of any preceding clause, wherein the magnetic component is configured to generate a tactile indication when the follower moves into the closed position.

A5. The detent mechanism of any preceding clause, wherein the magnetic component of the follower is configured to cooperate with another magnetic component to generate a tactile indication that indicates that the follower has moved into the closed position.

A6. The detent mechanism of any preceding clause, wherein magnetic attraction between the magnetic component of the follower and another magnetic component is configured to move the follower into the closed position.

A7. The detent mechanism of any preceding clause, wherein engagement between the actuator and the follower as the table leaf rotates from the deployed position toward the stowed position is configured to move the follower from the closed position toward the open position of the follower.

A8. The detent mechanism of any preceding clause, wherein the actuator comprises a pin, the actuator being configured to engage the follower with the pin.

A9. The detent mechanism of any preceding clause, wherein the follower comprises a channel, the actuator being configured to engage the follower within the channel.

A10. The detent mechanism of any preceding clause, wherein the follower comprises a stop configured to cooperate with another stop to prevent the follower from moving past the closed position of the follower.

A11. The detent mechanism of any preceding clause, wherein the follower comprises a stop configured to cooperate with another stop to prevent the follower from moving past the open position of the follower.

A12. The detent mechanism of any preceding clause, further comprising a torsion spring operatively connected to the follower such that the torsion spring is configured to bias the follower toward the open position of the follower.

A13. The detent mechanism of any preceding clause, further comprising a base, the follower being mounted to the base such that the follower is configured to move relative to the base between the open and closed positions of the follower, wherein the base is configured to be mounted to a carriage of the tray table.

A14. The detent mechanism of any preceding clause, wherein the follower is configured to rotate between the open position and the closed position of the follower.

A15. The detent mechanism of any preceding clause, wherein the actuator moves along an arc as the table leaf rotates between the stowed and deployed positions of the table leaf.

Clause set B:

B1. A tray table for an aircraft, the tray table comprising:

- a carriage;
- a table leaf mounted to the carriage such that the table leaf is selectively rotatable between a stowed position and a deployed position; and
- a detent mechanism comprising:
- an actuator mounted to the table leaf such that the actuator is configured to move along with the table leaf as the table leaf rotates between the stowed position and the deployed position;
- a base;
- a follower mounted to the base such that the follower is moveable relative to the carriage between an open position and a closed position of the follower, the follower being biased toward the open position of the follower, the follower being configured to be moved against the bias from the open position into the closed position by engagement of the actuator with the follower as the table leaf rotates from the stowed position into the deployed position; and
- a magnetic detent configured to releasably hold the follower in the closed position.

B2. The tray table of any preceding clause, wherein the magnetic detent is configured to generate an audible indication when the follower moves into the closed position.

B3. The tray table of any preceding clause, wherein the magnetic detent comprises first and second magnetic components of the follower and the base, respectively, the first and second magnetic components being configured to cooperate to generate an audible indication that indicates that the table leaf has moved into the deployed position.

B4. The tray table of any preceding clause, wherein the magnetic detent is configured to generate a tactile indication when the follower moves into the closed position.

B5. The tray table of any preceding clause, wherein the magnetic detent comprises first and second magnetic components of the follower and the base, respectively, the first and second magnetic components being configured to cooperate to generate a tactile indication that indicates that the table leaf has moved into the deployed position.

B6. The tray table of any preceding clause, wherein the magnetic detent comprises first and second magnetic components of the follower and the base, respectively, and wherein magnetic attraction between the first and second magnetic components is configured to move the follower into the closed position.

B7. The tray table of any preceding clause, wherein engagement between the actuator and the follower as the table leaf rotates from the deployed position toward the stowed position is configured to move the follower from the closed position toward the open position of the follower.

B8. The tray table of any preceding clause, wherein the actuator comprises a pin, the actuator being configured to engage the follower with the pin.

B9. The tray table of any preceding clause, wherein the follower comprises a channel, the actuator being configured to engage the follower within the channel.

B10. The tray table of any preceding clause, wherein the follower comprises a first stop and the base comprises a second stop, the first and second stops being configured to cooperate to prevent the follower from moving past the closed position of the follower.

B11. The tray table of any preceding clause, wherein the follower comprises a first stop and the base comprises a second stop, the first and second stops being configured to cooperate to prevent the table leaf from rotating past the deployed position of the table leaf.

B12. The tray table of any preceding clause, wherein follower comprises a first stop and the base comprises a second stop, the first and second stops being configured to cooperate to prevent the follower from moving past the open position of the follower.

B13. The tray table of any preceding clause, further comprising a torsion spring operatively connected to the follower such that the torsion spring is configured to bias the follower toward the open position of the follower.

B14. The tray table of any preceding clause, wherein the base is mounted to the carriage.

B15. The tray table of any preceding clause, wherein the base is integrally formed as a single-unitary structure with the carriage.

B16. The tray table of any preceding clause, wherein the follower is mounted to the base such that the follower is configured to rotate between the open position and the closed position of the follower.

B17. The tray table of any preceding clause, wherein the actuator moves along an arc as the table leaf rotates between the stowed and deployed positions of the table leaf.

B18. The tray table of any preceding clause, wherein the carriage is configured to expand outwardly and retract inwardly between an extended position and a retracted position of the tray table.

B19. The tray table of any preceding clause, wherein the tray table is configured to expand outwardly and retract inwardly between an extended position and a retracted position of the tray table, the tray table comprising rail sets that are slidably interconnected with each other via ball bearing assemblies such that the rail sets are configured to slide relative to each other to thereby expand and retract the tray table.

B20. The tray table of any preceding clause, wherein the tray table is configured to expand outwardly and retract inwardly between an extended position and a retracted position of the tray table, the tray table comprising rail sets that are slidably interconnected with each other and the carriage via slide block assemblies that enable the rail sets to slide relative to each other and the carriage.

Clause set C:

C1. A method of configuring a tray table for an aircraft, the method comprising:

mounting an actuator of a detent mechanism to a table leaf of the tray table such that the actuator is configured to move along with the table leaf as the table leaf rotates between a stowed position and a deployed position of the table leaf;

mounting a follower of the detent mechanism to a carriage of the tray table such that engagement of the actuator with the follower as the table leaf rotates from the stowed position into the deployed position moves the follower from an open position into a closed position of the follower; and operatively connecting a magnetic detent of the detent mechanism to the follower such that the magnetic detent generates at least one of an audible or a tactile indication when the table leaf moves into the deployed position.

C2. The method of any preceding clause, further comprising operatively connecting a biasing mechanism to the follower of the detent mechanism such that the biasing mechanism biases the follower toward the open position of the follower.

C3. The method of any preceding clause, further comprising operatively connecting the magnetic detent of the detent mechanism to the follower such that the magnetic detent is configured to move the follower into the closed position.

C4. The method of any preceding clause, further comprising mounting the actuator of the detent mechanism to the table leaf such that engagement between the actuator and the follower as the table leaf rotates from the deployed position toward the stowed position is configured to move the follower from the closed position toward the open position of the follower.

C5. The method of any preceding clause, further comprising configuring the follower with a stop configured to prevent the follower from moving past the closed position of the follower.

C6. The method of any preceding clause, further comprising configuring the follower with a stop configured to prevent the table leaf from rotating past the deployed position of the table leaf.

Clause set D:

D1. A detent mechanism for a tray table of an aircraft, the detent mechanism comprising:

a follower configured to move between an open position and a closed position, the follower being biased to the open position, the follower comprising a magnetic component configured to releasably hold the follower in the closed position; and an actuator configured to move along with a table leaf of the tray table as the table leaf rotates between a stowed position and a deployed position of the table leaf, the actuator being configured to engage the follower as the table leaf rotates from the stowed position into the deployed position such that the actuator moves the follower against the bias from the open position into the closed position.

Clause set E:

E1. A detent mechanism for a tray table of an aircraft, the detent mechanism comprising:

a connector rail configured to be held by a telescoping carriage that is configured to expand outwardly and retract inwardly relative to a base plate of the tray table between an extended position and a retracted position of the carriage, the connector rail being mounted to the carriage such that the connector rail is configured to move along with the carriage between the retracted position and a partially-extended position of the carriage; and a magnetic detent configured to releasably hold the carriage in the partially-extended position.

E2. The detent mechanism of any preceding clause, wherein the magnetic detent is configured to generate an audible indication when the carriage moves into the partially-extended position.

E3. The detent mechanism of any preceding clause, wherein the magnetic detent is configured to generate a tactile indication when the carriage moves into the partially-extended position.

E4. The detent mechanism of any preceding clause, wherein the magnetic detent comprises first and second magnetic components of the connector rail and the carriage, respectively, the first and second magnetic components being configured to cooperate to generate an audible indication that indicates that the carriage has moved into the partially-extended position.

E5. The detent mechanism of any preceding clause, wherein the magnetic detent comprises first and second magnetic components of the connector rail and the carriage, respectively, the first and second magnetic components being configured to cooperate to generate a tactile indication that indicates that the carriage has moved into the partially-extended position.

E6. The detent mechanism of any preceding clause, wherein the connector rail comprises a mechanical latch mechanism configured to releasably hold the connector rail in an extended position of the connector rail that corresponds to the partially-extended position of the carriage.

E7. The detent mechanism of any preceding clause, wherein the connector rail comprises a latch mechanism configured to releasably hold the connector rail in an extended position of the connector rail that corresponds to the partially-extended position of the carriage, the latch mechanism comprising a latch member of the connector rail and a latch catch of the base plate, wherein the latch member is configured to interlock with the latch catch as the connector rail moves into the extended position of the connector rail.

E8. The detent mechanism of any preceding clause, wherein the connector rail comprises a latch mechanism configured to releasably hold the connector rail in an extended position of the connector rail that corresponds to the partially-extended position of the carriage, the latch mechanism comprising a latch member of the connector rail and a latch catch of the base plate, wherein the latch member is configured to interlock with the latch catch with a snap-fit connection.

E9. The detent mechanism of any preceding clause, wherein the connector rail is configured to be slidably mounted to the carriage such that the connector rail is slidable relative to the carriage as the carriage moves from the partially-extended position toward the extended position.

E10. The detent mechanism of any preceding clause, further comprising a guide of the carriage, wherein the connector rail is configured to engage the guide as the connector rail moves relative to the carriage.

Although the present invention has been discussed above in connection with use on a passenger aircraft, the present invention is not limited to that environment and may also be used on passenger trains, cars, buses and other vehicles including, but not limited to, carts, carriages, and means of transportation mounted on rails.

Likewise, the present invention is also not to be limited to use in vehicles and may be used in non-vehicle or stationary environments where there is seating, and it is desirable to stow and deploy a flat work surface for use in the types of activities that the flat surfaces of tables, desks, countertops or the like are typically used for. Furthermore, the present invention is also not to be limited to use in connection with seating, and may be used in any environment where the device may be stowed within and deployed from a recess formed in a surface (e.g., a wall, a desktop, a table), or attached to a flat surface (e.g., a wall, a desktop, a table) that does not have a recess into which the device may be stowed.

In addition, the claimed invention is not limited in size and may be constructed in miniature versions or for use in very large-scale applications in which the same or similar principles of motion and friction control as described above would apply. Likewise, the length and width of the table surface areas provided by the table assemblies are not to be construed as drawn to scale, and that the lengths/widths of the table surface areas may be adjusted in conformance with the area available for stowage/deployment of the table assemblies. Furthermore, the figures (and various components shown therein) of the specification are not to be construed as drawn to scale.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the present application illustrated and described herein is not essential, unless otherwise specified. That is, the operations can be performed in any order, unless otherwise specified, and examples of the application can include additional or fewer operations than those disclosed herein. For example, it is contemplated that executing or performing a particular operation before, contemporaneously with, or after another operation (e.g., different steps, etc.) is within the scope of aspects and implementations of the application.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Further, references to "one embodiment" or "one implementation" are not intended to be interpreted as excluding the existence of additional embodiments or implementations that also incorporate the recited features. The term "exemplary" is intended to mean "an example of".

When introducing elements of aspects of the application or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the application in detail, it will be apparent that modifications and variations are possible without departing from the scope of aspects of the application as defined in the appended claims. As various changes could be made in the above constructions, products, and methods without departing from the scope of aspects of the application, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the application without departing from their scope. While the dimensions and types of materials described herein are intended to define the parameters of the various embodiments of the application, the embodiments are by no means limiting and are example embodiments. Many other embodiments will be apparent to those of ordinary skill in the art upon reviewing the above description. The scope of the various embodiments of the application should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the application, including the best mode, and also to enable any person of ordinary skill in the art to practice the various embodiments of the application, including making and using any devices or systems and performing any incorporated methods. The patentable scope of the various embodiments of the application is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A tray table for an aircraft, the tray table comprising:

a carriage;

a table leaf mounted to the carriage such that the table leaf is selectively rotatable between a stowed position and a deployed position; and a detent mechanism comprising:

an actuator mounted to the table leaf such that the actuator is configured to move along with the table leaf as the table leaf rotates between the stowed position and the deployed position;

a base;

a follower mounted to the base such that the follower is moveable relative to the carriage between an open position and a closed position of the follower, the follower being biased toward the open position of the follower, the follower being configured to be moved against the bias from the open position into the closed position by engagement of the actuator with the follower as the table leaf rotates from the stowed position into the deployed position; and a magnetic detent configured to releasably hold the follower in the closed position.

2. The tray table of claim 1, wherein the magnetic detent is configured to generate an audible indication when the follower moves into the closed position.

3. The tray table of claim 2, further comprising a torsion spring operatively connected to the follower such that the torsion spring is configured to bias the follower toward the open position of the follower.

4. The tray table of claim 1, wherein the magnetic detent comprises first and second magnetic components of the follower and the base, respectively, the first and second magnetic components being configured to cooperate to generate an audible indication that indicates that the table leaf has moved into the deployed position.

5. The tray table of claim 1, wherein the magnetic detent is configured to generate a tactile indication when the follower moves into the closed position.

6. The tray table of claim 1, wherein the magnetic detent comprises first and second magnetic components of the follower and the base, respectively, the first and second magnetic components being configured to cooperate to generate a tactile indication that indicates that the table leaf has moved into the deployed position.

7. The tray table of claim 1, wherein the magnetic detent comprises first and second magnetic components of the follower and the base, respectively, and wherein magnetic attraction between the first and second magnetic components is configured to move the follower into the closed position.

8. The tray table of claim 1, wherein engagement between the actuator and the follower as the table leaf rotates from the deployed position toward the stowed position is configured to move the follower from the closed position toward the open position of the follower.

9. The tray table of claim 1, wherein the actuator comprises a pin, the actuator being configured to engage the follower with the pin.

10. The tray table of claim 1, wherein the follower comprises a channel, the actuator being configured to engage the follower within the channel.

11. The tray table of claim 1, wherein the follower comprises a first stop and the base comprises a second stop, the first and second stops being configured to cooperate to prevent the follower from moving past the closed position of the follower.

12. The tray table of claim 1, wherein the follower comprises a first stop and the base comprises a second stop, the first and second stops being configured to cooperate to prevent the table leaf from rotating past the deployed position of the table leaf.

13. The tray table of claim 1, wherein follower comprises a first stop and the base comprises a second stop, the first and second stops being configured to cooperate to prevent the follower from moving past the open position of the follower.

14. The tray table of claim 1, wherein the base is mounted to the carriage.

15. The tray table of claim 1, wherein the base is integrally formed as a single-unitary structure with the carriage.

16. The tray table of claim 1, wherein the follower is mounted to the base such that the follower is configured to rotate between the open position and the closed position of the follower.

17. The tray table of claim 1, wherein the actuator moves along an arc as the table leaf rotates between the stowed and deployed positions of the table leaf.

18. The tray table of claim 1, wherein the carriage is configured to expand outwardly and retract inwardly between an extended position and a retracted position of the tray table.

19. The tray table of claim 1, wherein the tray table is configured to expand outwardly and retract inwardly between an extended position and a retracted position of the tray table, the tray table comprising rail sets that are slidably interconnected with each other via ball bearing assemblies such that the rail sets are configured to slide relative to each other to thereby expand and retract the tray table.

20. The tray table of claim 1, wherein the tray table is configured to expand outwardly and retract inwardly between an extended position and a retracted position of the tray table, the tray table comprising rail sets that are slidably interconnected with each other and the carriage via slide block assemblies that enable the rail sets to slide relative to each other and the carriage.

21. A method of configuring a tray table for an aircraft, the method comprising:

mounting an actuator of a detent mechanism to a table leaf of the tray table such that the actuator is configured to move along with the table leaf as the table leaf rotates between a stowed position and a deployed position of the table leaf;

mounting a follower of the detent mechanism to a carriage of the tray table such that engagement of the actuator with the follower as the table leaf rotates from the stowed position into the deployed position moves the follower from an open position into a closed position of the follower; and operatively connecting a magnetic detent of the detent mechanism to the follower such that the magnetic detent generates at least one of an audible or a tactile indication when the table leaf moves into the deployed position.

22. The method of claim 21, further comprising operatively connecting a biasing mechanism to the follower of the detent mechanism such that the biasing mechanism biases the follower toward the open position of the follower.

23. The method of claim 21, further comprising operatively connecting the magnetic detent of the detent mechanism to the follower such that the magnetic detent is configured to move the follower into the closed position.

24. The method of claim 21, further comprising mounting the actuator of the detent mechanism to the table leaf such that engagement between the actuator and the follower as the table leaf rotates from the deployed position toward the stowed position is configured to move the follower from the closed position toward the open position of the follower.

25. The method of claim 21, further comprising configuring the follower with a stop configured to prevent the follower from moving past the closed position of the follower.

26. The method of claim 21, further comprising configuring the follower with a stop configured to prevent the table leaf from rotating past the deployed position of the table leaf.

* * * * *